United States Patent
Kim et al.

(10) Patent No.: US 10,742,060 B2
(45) Date of Patent: Aug. 11, 2020

(54) ELECTRONIC DEVICE AND OPERATING METHOD THEREOF

(71) Applicant: SAMSUNG ELECTRONICS CO., LTD., Suwon-si, Gyeonggi-do (KR)

(72) Inventors: Yusu Kim, Yongin-si (KR); Seho Park, Yongin-si (KR); Jung-Oh Sung, Suwon-si (KR); Ku-Chul Jung, Suwon-si (KR); Yong Sang Yun, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 512 days.

(21) Appl. No.: 15/400,263

(22) Filed: Jan. 6, 2017

(65) Prior Publication Data

US 2017/0201117 A1    Jul. 13, 2017

(30) Foreign Application Priority Data

Jan. 8, 2016  (KR) .................. 10-2016-0002880
Jul. 20, 2016  (KR) .................. 10-2016-0092265

(51) Int. Cl.
*H02J 7/02* (2016.01)
*H02J 50/80* (2016.01)
*H02J 50/12* (2016.01)
*H02J 7/04* (2006.01)

(52) U.S. Cl.
CPC .............. *H02J 7/025* (2013.01); *H02J 7/042* (2013.01); *H02J 50/12* (2016.02); *H02J 50/80* (2016.02)

(58) Field of Classification Search
CPC .. H02J 7/025; H02J 50/12; H02J 50/40; H02J 50/80; H02J 5/005; H02J 7/042

USPC .......... 320/108, 125, 132, 134; 307/31, 104, 307/108, 149
See application file for complete search history.

(56) References Cited

U.S. PATENT DOCUMENTS

| | | | |
|---|---|---|---|
| 2009/0284082 A1 | 11/2009 | Mohammadian | |
| 2011/0215756 A1* | 9/2011 | Shimizu | H02J 7/00 320/108 |
| 2012/0214534 A1 | 8/2012 | Zhu et al. | |
| 2013/0335016 A1* | 12/2013 | Jung | H02J 50/10 320/108 |
| 2015/0364946 A1 | 12/2015 | Wang et al. | |
| 2015/0371771 A1 | 12/2015 | Abu Qahouq | |
| 2016/0268815 A1 | 9/2016 | Lee et al. | |

(Continued)

FOREIGN PATENT DOCUMENTS

| | | |
|---|---|---|
| EP | 2 093 857 A2 | 8/2009 |
| EP | 2 752 961 A1 | 7/2014 |

(Continued)

OTHER PUBLICATIONS

"The Qi Wireless Power Transfer System Power Class 0 Specification", Wireless Power Consortium, version 1.2.2, draft 3, Mar. 2016, 160 pages.

(Continued)

*Primary Examiner* — Edward Tso
*Assistant Examiner* — Aaron Piggush
(74) *Attorney, Agent, or Firm* — Nixon & Vanderhye P.C.

(57) ABSTRACT

An electronic device and an operation method thereof according to various example embodiments wirelessly receive detection power for detecting the electronic device, and put a limitation on storing the power.

20 Claims, 19 Drawing Sheets

(56) References Cited

U.S. PATENT DOCUMENTS

2016/0336804 A1* 11/2016 Son ................ H02J 7/0027
2017/0201130 A1* 7/2017 Park ................ H02J 50/90

FOREIGN PATENT DOCUMENTS

| EP | 2 752 964 A2 | 7/2014 |
|----|---|---|
| KR | 10-2014-0089824 | 7/2014 |
| KR | 10-2014-0098569 | 8/2014 |
| KR | 10-2016-0109955 | 9/2016 |
| WO | 2014/169262 | 10/2014 |
| WO | WO 2015/193209 | 12/2015 |

OTHER PUBLICATIONS

"AirFuel Resonant Wireless Power Transfer (WPT) System Baseline System Specification (BSS)", AirFuel Alliance, AFA TS-0010-0 v2.00, Apr. 27, 2016, 87 pages.
Search Report and Written Opinion dated Mar. 17, 2017 in counterpart International Patent Application No. PCT/KR2017/000126.
EP Extended Search Report for EP Application No. 17736104.5 dated Dec. 19, 2018.
Office Action for AU Application No. 2017205843 dated Jan. 10, 2019.
AU Notice of Acceptance dated May 14, 2019 for AU Application No. 2017205843.

* cited by examiner

ELECTRONIC DEVICE AND OPERATING METHOD THEREOF

CROSS-REFERENCE TO RELATED APPLICATIONS

The present application is based on and claims priority under 35 U.S.C. § 119 to an application filed in the Korean Intellectual Property Office on Jan. 8, 2016 and assigned Serial No. 10-2016-0002880, and an application filed in the Korean Intellectual Property Office on Jul. 20, 2016 and assigned Serial No. 10-2016-0092265, the contents of which are incorporated by reference herein in their entireties.

BACKGROUND

1. Technical Field

The present disclosure relates generally to an electronic device and an operating method thereof.

2. Description of Related Art

With the development of technology, a wireless charging system for wirelessly charging an electronic device has been suggested. An electronic device in the wireless charging system includes a wireless power transmission device and a wireless power reception device. The wireless power transmission device may wirelessly transmit power and the wireless power reception device may wirelessly receive power.

To wirelessly transmit power to the wireless power reception device, the wireless power transmission device detects the wireless power reception device. The wireless power transmission device may output a detection signal and detect the wireless power reception device by detecting an impedance change.

An electronic device may include an impedance generation device for controlling an input of a detection signal received from a wireless power transmission device, and a dummy load may be configured as the impedance generation device. To form a dummy load means, an element should additionally be provided. However, the element may consume power, causing heat in the electronic device.

SUMMARY

According to various example embodiments, power of a signal received at a power receiver may be transmitted to a power storage through a controller, and a load change may be generated according to a power specification requiring wireless charging.

According to various example embodiments, a method of operating an electronic device includes: wirelessly receiving detection power for detecting the electronic device; delivering the detection power to a power storage of the electronic device; and generating a limitation signal related to the detection power.

According to various example embodiments, an electronic device includes: a power receiver configured to wirelessly receive power; a power storage configured to store the power; and a controller functionally connected to the power receiver and the power storage, the controller being configured to wirelessly receive detection power for detecting the electronic device, to deliver the detection power to the power storage, and to generate a limitation signal related to the detection power.

According to various example embodiments, an electronic device includes: a power receiver configured to wirelessly receive power; a power storage configured to store the power; a communication unit comprising communication circuitry configured to communicate with an external device; and a controller electrically connected to the power receiver, the communication unit, and the power storage, the controller being configured to detect power of a signal in a non-power reception mode from the power receiver, to change an impedance to set the detected power to be within a predetermined range, and to generate a limitation signal.

According to various example embodiments, the electronic device may be configured to remove a dummy load and to provide an impedance change. An element causing heat in the dummy load may be removed.

According to various example embodiments of the present disclosure, energy consumed in the dummy load may not be consumed using a charging device and may be used for charging.

BRIEF DESCRIPTION OF THE DRAWINGS

These and other aspects, features and attendant advantages will become more readily apparent from the following detailed description, taken in conjunction with the accompanying drawings, in which like reference numerals refer to like elements, and wherein.

DETAILED DESCRIPTION

Figure 1:
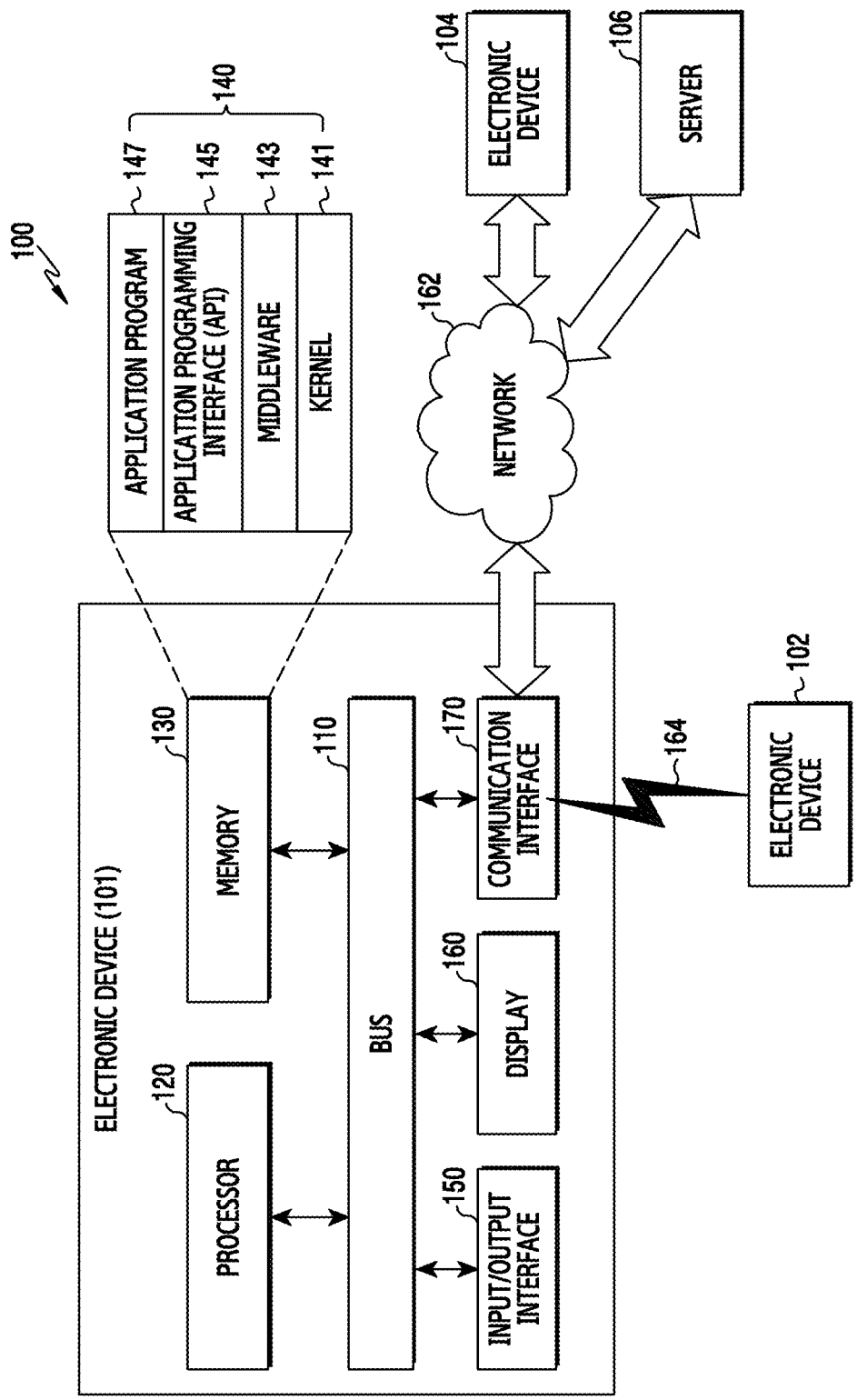
FIG. 1 is a block diagram illustrating an example network environment system according to various example embodiments.

Hereinafter, various example embodiments of the present disclosure will be described with reference to the accompanying drawings. However, it should be understood that there is no intent to limit the present disclosure to the particular forms of the various example embodiments disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be interchangeable with, for example, "suitable for", "having the capacity to", "designed to", "adapted to", "made to", or "capable of" according to the situation. The term "configured to" may not necessarily imply "specifically designed to" in hardware. In some situations, the expression "device configured to" may refer, for example, to a situation in which the device, together with other devices or components, "is able to". For example, the phrase "processor adapted (or configured) to perform A, B, and C" may refer, for example, to a dedicated processor (e.g. embedded processor including processing circuitry) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe various example embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even if the term is defined in the present disclosure, it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™, an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to some example embodiments of the present disclosure may be a flexible device. Further, the electronic device according to an example embodiment of the present disclosure is not limited to the aforementioned devices, and may include a new electronic device according to the development of technology.

Hereinafter, an electronic device according to various example embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various example embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an example embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

The middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry configured to function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry configured to establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an example embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an example embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
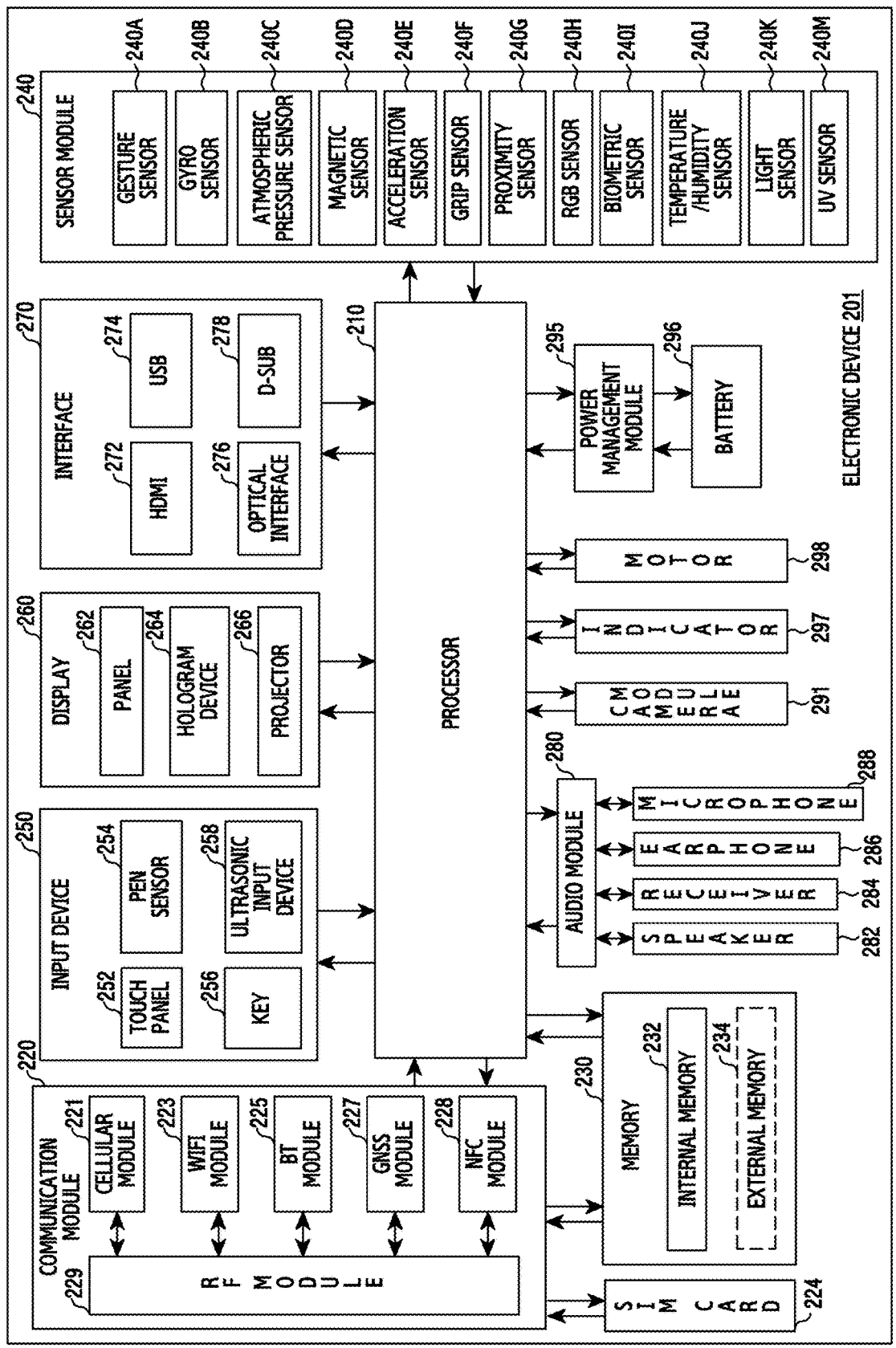
FIG. 2 is a block diagram illustrating an example electronic device according to various example embodiments.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors 210 (e.g., processing circuitry including Application Processors (AP)), a communication module (e.g., including communication circuitry) 220, a subscriber information module (SIM) (e.g., including a SIM card) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry provided to control a plurality of hardware or software components connected to the processor 210 by driving an operating system or an application program, and perform processing of various pieces of data and calculations. The processor 210 may be embodied as, for example, various processing circuitry, a System on Chip (SoC), or the like. According to an example embodiment of the present disclosure, the processor 210 may further include a Graphic Processing Unit (GPU) and/or an image signal processor. The processor 210 may include at least some (e.g., a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (e.g: SIM card) 224 (e.g., the SIM card). According to an example embodiment of the present disclosure, the cellular module 221 may perform at least some of the functions that the AP 210 may provide. According to an example embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an example embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an example embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an example embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various example embodiments, the electronic device may include at least one of the above-described elements. Some of the above-described elements may be omitted from the electronic device, or the electronic device may further include additional elements. Also, some of the hardware components according to various example embodiments may be combined into one entity, which may perform functions identical to those of the relevant components before the combination.

Figure 3:
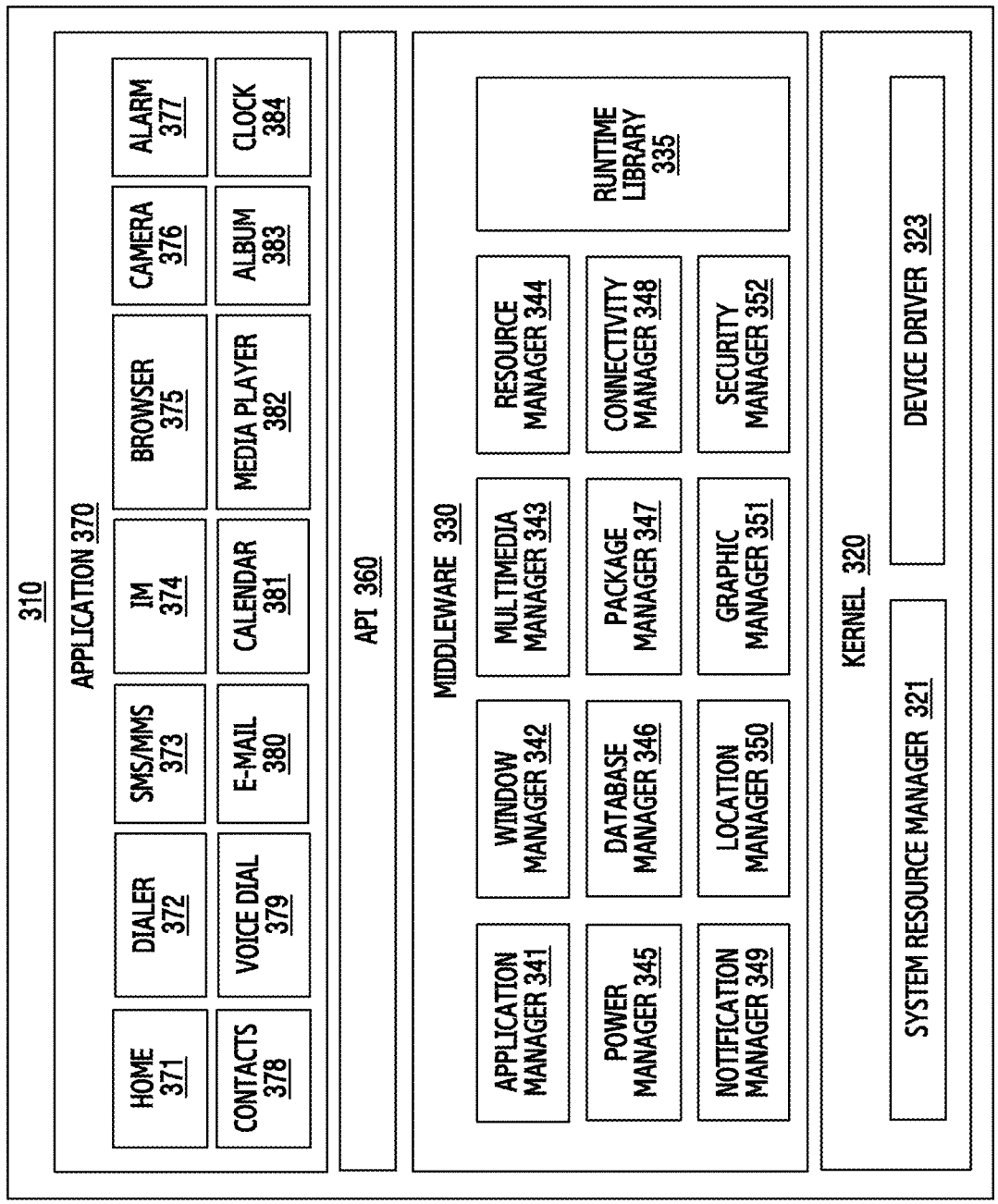
FIG. 3 is a block diagram illustrating an example program module according to various example embodiments.

FIG. 3 is a block diagram illustrating an example program module according to various example embodiments of the present disclosure.

According to an example embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an example embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an example embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an example embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an example embodiment of the present disclosure, the applications 370 may include applications (e.g., a health care application of a mobile medical appliance or the like) designated according to an external electronic device (e.g., attributes of the electronic device 102 or 104).

According to an example embodiment of the present disclosure, the applications 370 may include an application received from an external electronic device (e.g., the server 106, or the electronic device 102 or 104). According to an example embodiment of the present disclosure, the applications 370 may include a preloaded application or a third party application that may be downloaded from a server. The names of the components of the program module 310 of the illustrated example embodiments of the present disclosure may change according to the type of operating system.

According to various example embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may refer, for example, to a unit including one of hardware (e.g., circuitry), software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

Figure 4:
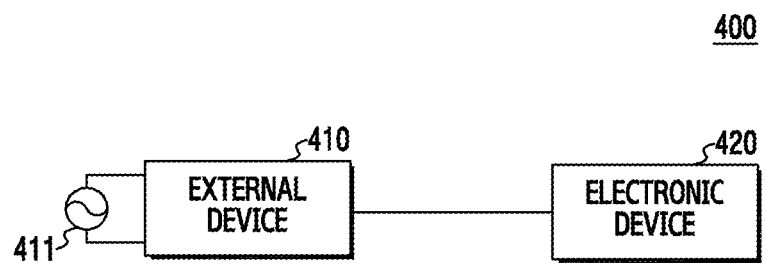
FIG. 4 is a block diagram illustrating an example wireless charging system according to various example embodiments.

FIG. 4 is a block diagram illustrating an example wireless charging system 400 according to various example embodiments.

Referring to FIG. 4, the wireless charging system 400 according to various example embodiments may include an external device 410 and an electronic device 420.

The external device 410 may wirelessly transmit power. To achieve this, the external device 410 may be connected to a power source 411 to receive power from the power source 411. According to various example embodiments, the external device 410 may transmit alternating current (AC) power. In this example, the external device 410 may transmit power using a wireless power protocol. According to various example embodiments, the external device 410 may transmit power according to at least one specified transmission method. For example, the transmission method may include an electromagnetic induction method, a resonance method, and a radio frequency (RF)/micro wave radiation method, or the like, but is not limited thereto.

The electronic device 420 may wirelessly receive power. According to various example embodiments, the electronic device 420 may receive power from the external device 410. According to various example embodiments, the electronic device 420 may receive AC power. In addition, the electronic device 420 may convert the AC power into direct current (DC) power. The electronic device 420 may receive power using a wireless power protocol. According to various example embodiments, the electronic device 420 may receive power according to a specified reception method. For example, the reception method may include an electromagnetic induction method, a resonance method, and an RF/micro wave radiation method, or the like, but is not limited thereto. Through this, the electronic device 420 may be driven using power.

According to various example embodiments, in order for the electronic device 420 to receive power from the external device 410, the reception method of the electronic device 420 should be consistent with the transmission method of the external device 410. For example, when the transmission method of the external device 410 and the reception method of the electronic device 420 are consistent with each other as the electromagnetic induction method, the external device 410 may transmit power in the electromagnetic induction method and the electronic device 420 may receive power in the electromagnetic induction method. When the transmission method of the external device 410 and the reception method of the electronic device 420 are consistent with each other as the resonance method, the external device 410 may transmit power in the resonance method and the electronic device 420 may receive power in the resonance method. When the transmission method of the external device 410 and the reception method of the electronic device 420 are consistent with each other as the RF/micro wave radiation method, the external device 410 may transmit power in the RF/micro wave radiation method and the electronic device 420 may receive power in the RF/micro wave radiation method.

According to various example embodiments, in order to receive power from the external device 410, the electronic device 420 may be disposed to correspond to the external device 410. According to various example embodiments, the electronic device 420 may be disposed within a specified distance from the external device 410. For example, the external device 410 may include a specified charging region. Through this, when the electronic device 420 is disposed in the charging region, the external device 410 may detect the electronic device 420.

Figure 5:
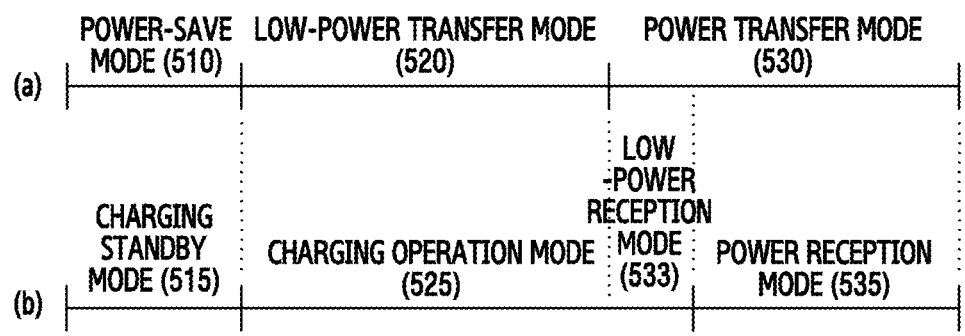
FIG. 5 is a diagram illustrating an example timing chart to illustrate an example operating method of a wireless charging system according to various example embodiments.

FIG. 5 is a timing chart illustrating an example method of operating the wireless charging system 400 according to various example embodiments. In this example, view (a) of FIG. 5 illustrates operation modes of the external device 410, and view (b) of FIG. 5 illustrates operation modes of the electronic device 420. According to various example embodiments, the transmission method of the external device 410 and the reception method of the electronic device 420 may be the resonance method or the electromagnetic induction method.

Referring to FIG. 5, the operation modes of the external device 410 may include a power-save mode 510, a low-power transfer mode 520, and a power transfer mode 530. In response to these, the operation modes of the electronic device 420 may include a charging standby (null) mode 515, a charging operation (boot) mode 525, a low-power reception mode 533, and a power reception (on) mode 535.

In the power-save mode 510, the external device 410 may transmit detection power for detecting the electronic device 420. In the charging standby mode 515, the electronic device 420 may receive the detection power. Through this, the external device 410 may detect a load change based on the detection power. For example, the external device 410 may detect the electronic device 420 based on the load change. The electronic device 420 may perform a communication function based on the detection power.

In the low-power transfer mode 520, the external device 410 may communicate with the electronic device 420. According to various example embodiments, the low-power transfer mode 520 may be an operation mode which is activated when power exceeds Vref boot. In the charging operation mode 525, the electronic device 420 may communicate with the external device 410. In this example, the external device 410 and the electronic device 420 may exchange their respective identification information and configuration information with each other. The configuration information may indicate the presence/absence of a configuration state according to a resonance state or an induction state. For example, state information may indicate capability to wirelessly charge. According to an example embodiment, when the transmission method of the external device 410 and the reception method of the electronic device 420 are the resonance method, the configuration information may include the state information. According to another example embodiment, when the transmission method of the external device 410 and the reception method of the electronic device 420 are the electromagnetic induction method, the configuration information may not include the state information.

In the power transfer mode 530, the external device 410 may transmit charging power for charging the electronic device 420. The electronic device 420 may further include the low-power reception mode 533, and in the low-power reception mode 533, the electronic device 420 may perform a preparing function for receiving the charging power from the external device 410. According to an example embodiment, when the external device 410 transmits an enable signal indicating that the external device 410 is prepared to transmit the charging power, the electronic device 420 may operate in the power reception mode 535. In the power reception mode 535, the electronic device 420 may receive the charging power from the external device 410 and may be charged.

Figure 6:
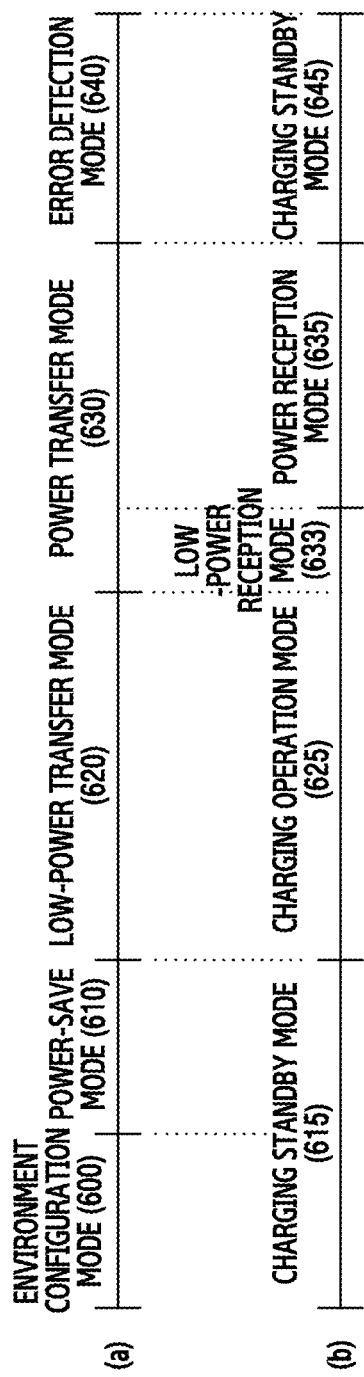
FIG. 6 is a diagram illustrating an example of an operating method of a wireless charging system according to an example embodiment.
Figure 7:
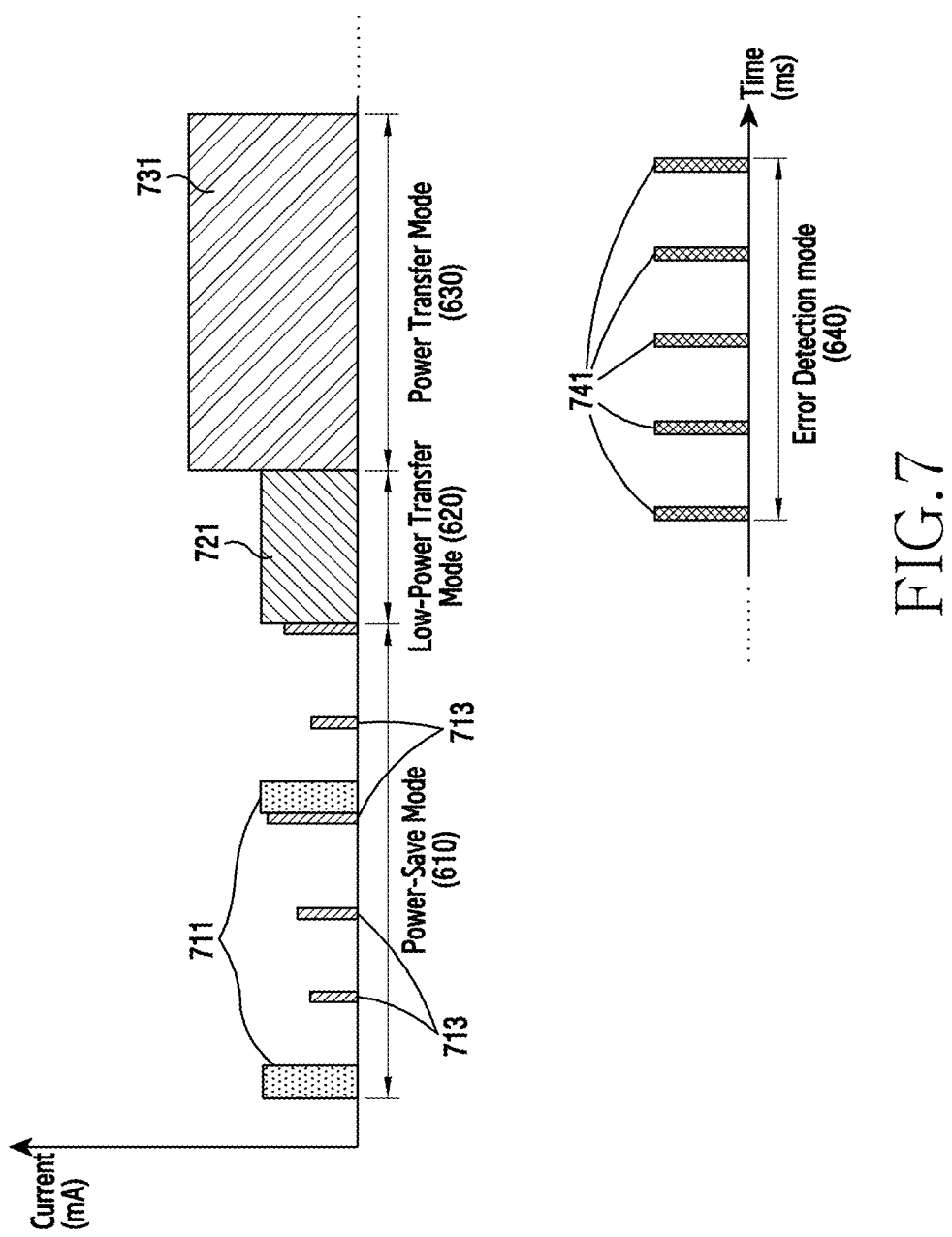
FIG. 7 is a diagram illustrating an example of a method of operating an external device in FIG. 6.

FIG. 6 is a diagram illustrating an example method of operating the wireless charging system 400 according to various example embodiments. FIG. 7 is a diagram illustrating an example method of operating the external device 410. View (a) of FIG. 6 illustrates operation modes of the external device 410, and view (b) of FIG. 6 illustrates operation modes of the electronic device 420. According to an example embodiment, the transmission method of the external device 410 and the reception method of the external device 420 may be the resonance method.

Referring to FIG. 6, the operation modes of the external device 410 may include an environment configuration mode 600, a power-save mode 610, a low-power mode 620, a power transfer mode 630, and an error detection mode 640. In response to these, the operation modes of the electronic device 420 may include a charging standby mode 615, a charging operation mode 625, a low-power reception mode 633 and a power reception mode 635.

In the environment configuration mode 600, the external device 410 may configure an environment. For example, the external device 410 may receive power from the power source 411. In addition, when power is supplied from the power source 411, the external device 410 may configure an environment for wirelessly transmitting power. In addition, the external device 410 may determine how much power is supplied from the power source 411 and determine whether it is possible to perform wireless fast charging according to the determined power. The external device 410 may configure the environment based on the result of the determining.

In the power-save mode 610, the external device 410 may transmit detection power 711, 713 for detecting the electronic device 420. In addition, the external device 410 may transmit the detection power 711, 713 in predetermined output periods. For example, the detection power 711, 713 may be beacons. In addition, the external device 410 may detect the electronic device 420 based on the detection power 711, 713. In this example, the external device 410 may detect a load change based on the detection power 711, 713. Through this, the external device 410 may detect the electronic device 420 based on the load change.

According to an example embodiment, the external device 410 may transmit the detection power 711, 713 as illustrated in FIG. 7. The detection power 711, 713 may include a long beacon 711 and a short beacon 713. The output time of the long beacon 711 and the output time of the short beacon 713 may be different from each other. For example, the output time of the long beacon 711 may exceed the output time of the short beacon 713. The output current (or power) of the long beacon 711 may be constant or variable. In addition, the output current (or power) of the short beacon 713 may be constant or variable. In addition, the output current of the long beacon 711 and the output current of the short beacon 713 may be different from each other. For example, the output current of the long beacon 711 may exceed the output current of the short beacon 713. For example, the long beacon 711 may transmit relatively high power (current) per hour in comparison to the short beacon 713. The output period of the long beacon 711 and the output period of the short beacon 713 may be different from each other. For example, the output period of the long beacon 711 may exceed the output period of the short beacon 713. The long beacon 711 may be output within a predetermined time interval from the time that the output of the short beacon 713 is ended. For example, the long beacon 711 may be output, following the short beacon 713.

In response to the environment configuration mode 600 and the power-save mode 610 of the external device 410, the electronic device 420 may be in the charging standby mode 615. In the charging standby mode 615, the electronic device 420 may stand by to receive the detection power 711, 713. In addition, the electronic device 420 may receive the detection power 711, 713 within a specified distance from the external device 410. Through this, the electronic device 420 may perform a communication function based on the detection power 711, 713.

In the low-power transfer mode 620, the external device 410 may transmit operation power 721 for operating the electronic device 420. When the electronic device 420 is detected, the external device 410 may enter the low-power transfer mode 620. In addition, the external device 410 may transmit the operation power 721. In this example, the operation power 721 may be determined based on predetermined output time and predetermined output current. For example, the external device 410 may output the predetermined output current during the predetermined output time, thereby transmitting the operation power 721. For example, the time length of the low-power transfer mode 620 may be determined based on the output time of the operation power 721.

According to an example embodiment, the external device 410 may transmit the operation power 721 as illustrated in FIG. 7. The output time of the operation power 721 may exceed the output time of the detection power 711, 713.

For example, the output time of the operation power 721 may exceed the output time of the long beacon 711. The output current of the operation power 721 may be greater than or equal to the output current of the detection power 711, 713. For example, a relatively higher output current of the operation power 721 than the output current of the detection power 711, 713 may be transmitted per hour. For example, the output power of the operation power 721 may be the same as the output power of the long beacon 711.

In the low-power transfer mode 620, the external device 410 may receive a discovery signal for discovering the external device 410 from the electronic device 420. In addition, in response to the discovery signal, the external device 410 may transmit a response signal to the electronic device 420. Through this, the external device 410 may establish a connection for wirelessly charging with the electronic device 420. In addition, the external device 410 may receive a request signal for charging power from the electronic device 420. In response to the request signal, the external device 410 may transmit a response signal to the electronic device 420. To achieve this, the external device 410 may receive state information of the electronic device 420 and transmit state information of the external device 410. For example, the state information may indicate capability to wirelessly charge. In addition, the external device 410 may receive an operation signal from the electronic device 420.

In response to the low-power transfer mode 620 of the external device 410, the electronic device 420 may be in the charging operation mode 625. In the charging operation mode 625, the electronic device 420 may receive the operation power 721. The electronic device 420 may receive the operation power 721 within a specified distance from the external device 410. Through this, the electronic device 420 may be operated based on the operation power 721. In this case, the electronic device 420 may maintain the communication function.

In the charging operation mode 625, the electronic device 420 may transmit a discovery signal for discovering the external device 410. For example, the discovery signal may be an advertisement signal based on Bluetooth low energy. The electronic device 420 may transmit the discovery signal in specified discovery periods. In addition, the electronic device 420 may receive a response signal corresponding to the discovery signal from the external device 410. Through this, the electronic device 420 may establish a connection for wirelessly charging with the external device 410. In addition, the electronic device 420 may transmit a request signal for charging power to the external device 410, and in response to this, may receive a response signal from the external device 410. To achieve this, the electronic device 420 may transmit state information of the electronic device 420 and receive state information of the external device 410. For example, the state information may indicate capability to wirelessly charge. In addition, the electronic device 420 may transmit an operation signal to the external device 410. For example, the operation signal may include a value regarding at least one parameter for wirelessly charging in the electronic device 420. The electronic device 420 may transmit the operation signal in specified output periods.

In the power transfer mode 630, the external device 410 may transmit charging power 731 for charging the electronic device 420. When the operation signal is received from the electronic device 420, the external device 410 may enter the power transfer mode 630. In addition, the external device 410 may transmit the charging power 731 to the electronic device 420. In this example, the charging power 731 may be determined based on an output time and an output current and voltage. For example, the external device 410 may output predetermined output current during predetermined output time, thereby transmitting the charging power 731. For example, the time length of the power transfer mode 630 may be determined based on the output time of the charging power 731.

According to an example embodiment, the external device 410 may transmit the charging power 731 as illustrated in FIG. 7. The output time of the charging power 731 may be the same as the output time of the operation power 721 or may be different therefrom. The output current of the charging power 731 may be greater than or equal to the output current of the operation power 721.

In the power transfer mode 630, the external device 410 may transmit a control signal for controlling wireless charging of the electronic device 420. In addition, the external device 410 may receive an operation signal from the electronic device 420.

In response to the power transfer mode 630 of the external device 410, the electronic device 420 may be in the lower-power reception mode 633 and the power reception mode 635. In the charging operation mode 625, the electronic device 420 may receive the control signal from the external device 410. In addition, in response to the control signal of the external device 410, the electronic device 420 may enter the low-power reception mode 633. The electronic device 420 may further include the low-power reception mode 633. The low-power reception mode 633 may be a mode in which the electronic device 420 is prepared to receive charging power from the external device 410. For example, when the electronic device 420 receives suddenly charging power or the charging power is high, this may influence an inner circuit of the electronic device 420. When charging power is high, it is common that wireless communication charging of the electronic device 420 is reset according to a drop of voltage. Accordingly, the electronic device 420 may operate in the low-power reception mode 633 to prevent the above-described problem. Accordingly, the electronic device 420 may or may not operate in the low-power reception mode 633.

In the power reception mode 635, the electronic device 420 may receive the charging power 731. The electronic device 420 may receive the charging power 731 within a specified distance from the external device 410. Through this, the electronic device 420 may store the charging power 731 and may be driven based on the charging power 731. In this case, the electronic device 420 may maintain the communication function. When an error occurs while the charging power 731 is being received, the electronic device 420 may detect the error. In addition, the electronic device 420 may transmit a warning signal to notify the external device 410 of the error.

In the power reception mode 635, the electronic device 420 may transmit an operation signal to the external device 410. For example, the operation signal may include a value regarding at least one parameter for wirelessly charging in the electronic device 420. The electronic device 420 may transmit the operation signal in specified output periods. For example, the electronic device 420 may transmit the warning signal through the operation signal. The electronic device 420 may transmit the warning signal separately from the operation signal.

In the error detection mode 640, the external device 410 may transmit change detection power 741 for detecting a change of the electronic device 420. When the warning signal is received from the electronic device 420, the external device 410 may enter the error detection mode 640. In addition, the external device 410 may transmit the change detection power 741. In this example, the change detection power 741 may be determined based on predetermined output time and predetermined output current. For example, the external device 410 may output the predetermined output current during the predetermined output time, thereby transmitting the change detection power 741. In addition, the external device 410 may transmit the change detection power 741 in predetermined output periods. For example, the change detection power 741 may be a beacon. In addition, based on the change detection power 741, the external device 410 may detect a change of the electronic device 420. In this example, the external device 410 may detect a load change based on the change detection power 741. Through this, the external device 410 may detect the change of the electronic device 420 based on the load change. For example, the external device 410 may detect withdrawal of the electronic device 420.

According to an example embodiment, the external device 410 may transmit the change detection power 741 as illustrated in FIG. 7. The output time of the change detection power 741 may be the same as the output time of the detection power 711, 713 or may be different therefrom. The output current of the change detection power 741 may be constant or variable. In addition, the output current of the change detection power 741 may be the same as the output current of the detection power 711, 713 or may be different therefrom. The output period of the change detection power 741 may be the same as the output period of the detection power 711, 713 or may be different therefrom. In addition, when a change of the electronic device 420 is detected, the external device 410 may enter the power-save mode 610.

In response to the error detection mode 640 of the external device 410, the electronic device 420 may be in the charging standby mode 645. After transmitting the warning signal, the electronic device 420 may enter the charging standby mode 645.

Figure 8:
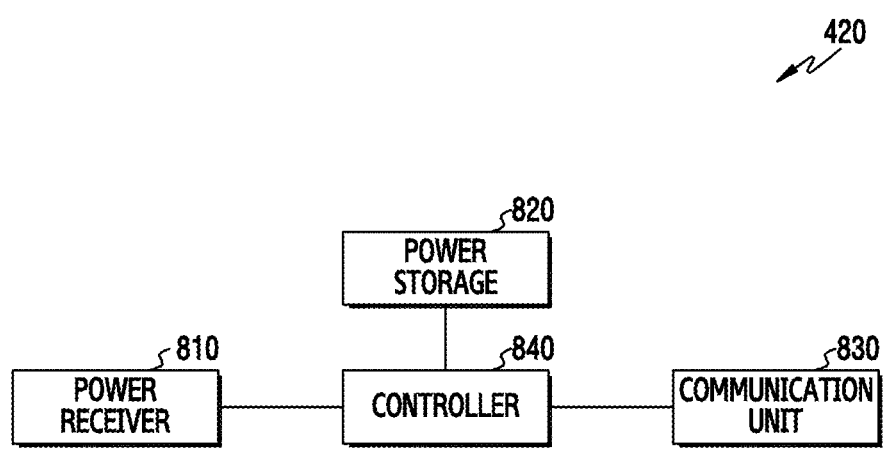
FIG. 8 is a block diagram illustrating an example electronic device according to various example embodiments.

FIG. 8 is a block diagram illustrating an example electronic device 420 according to various example embodiments.

Referring to FIG. 8, the electronic device 420 according to various example embodiments may include a power receiver (e.g., including power receiving circuitry) 810, a power storage 820, a communication unit (e.g., including communication circuitry) 830, and a controller 840.

The power receiver 810 may include various power receiving circuitry to wirelessly receive power in the electronic device 420. In this example, the power receiver 810 may receive power according to a reception method of the electronic device 420. For example, the power receiver 810 may receive AC power. According to an example embodiment, the reception method of the electronic device 420 may be the resonance method. According to another example embodiment, the reception method of the electronic device 420 may be the electromagnetic induction method.

The power storage 820 may mange power in the electronic device 420. In this example, the power storage 820 may store power. In addition, the power storage 820 may distribute power to elements in the electronic device 420. For example, the power storage 820 may manage DC power.

The communication unit 830 may include various communication circuitry configured to perform communication in the electronic device 420. In this example, the communication unit 830 may communicate with the external device 410 in various communication methods. According to various example embodiments, the communication unit 830 may include communication circuitry to access at least one of a mobile communication network or a data communication network. In addition, the communication unit 830 may perform short-distance communication. The communication unit 830 may include various communication circuitry, such as, for example, and without limitation, at least one radio antenna. For example, the communication method may include Long Term Evolution (LTE), Wideband Code Division Multiple Access (WCDMA), Global System for Mobile Communications (GSM), Wireless Fidelity (WiFi), Bluetooth, BLE, ZigBee, and Near Field Communications (NFC).

The controller 840 may include processing circuitry configured to control the overall operation in the electronic device 420. The controller 840 may control the elements of the electronic device 420. In this example, the controller 840 may receive power from the power receiver 810 and process the power. In addition, the controller 840 may receive instructions or data from the elements of the electronic device 420 and process the instructions or data.

Figure 9:
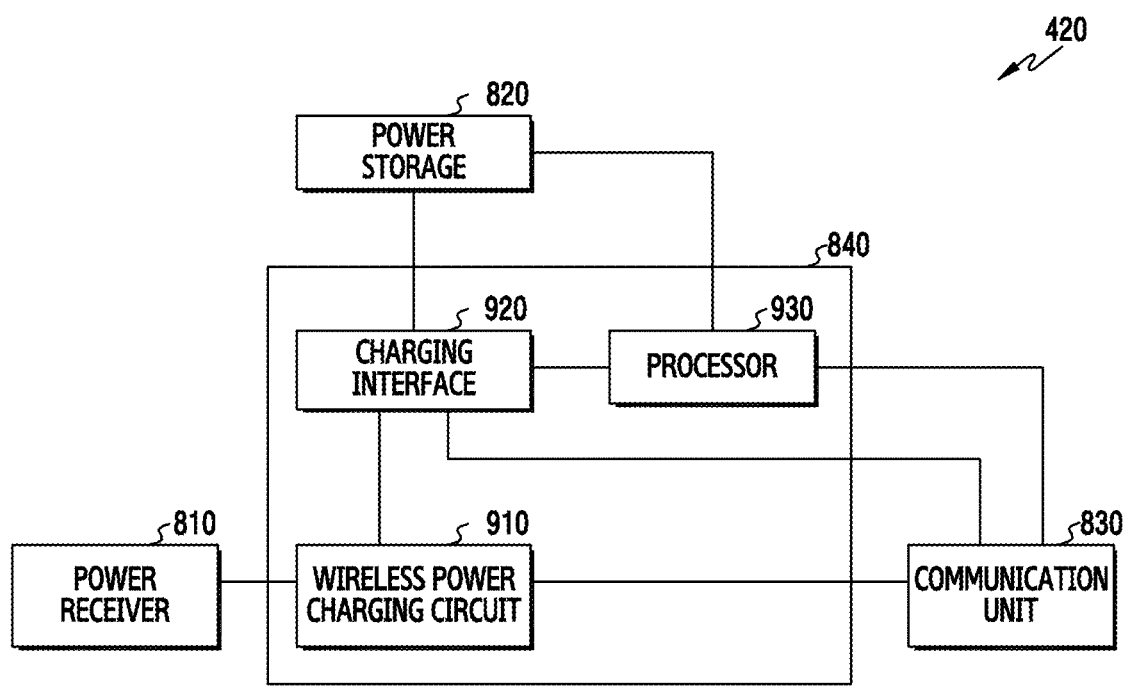
FIG. 9 is a block diagram illustrating an example controller of FIG. 8.

FIG. 9 is a block diagram illustrating an example of the controller 840 of FIG. 8. Referring to FIG. 9, the controller 840 may include a wireless power charging circuit 910, a charging interface 920, and a processor (e.g., including processing circuitry) 930.

The wireless power charging circuit 910 may receive power from the power receiver 810 and process the power. For example, the wireless power charging circuit 910 may receive AC power from the power receiver 810. In addition, the wireless power charging circuit 910 may process the AC power into DC power.

Figure 10:
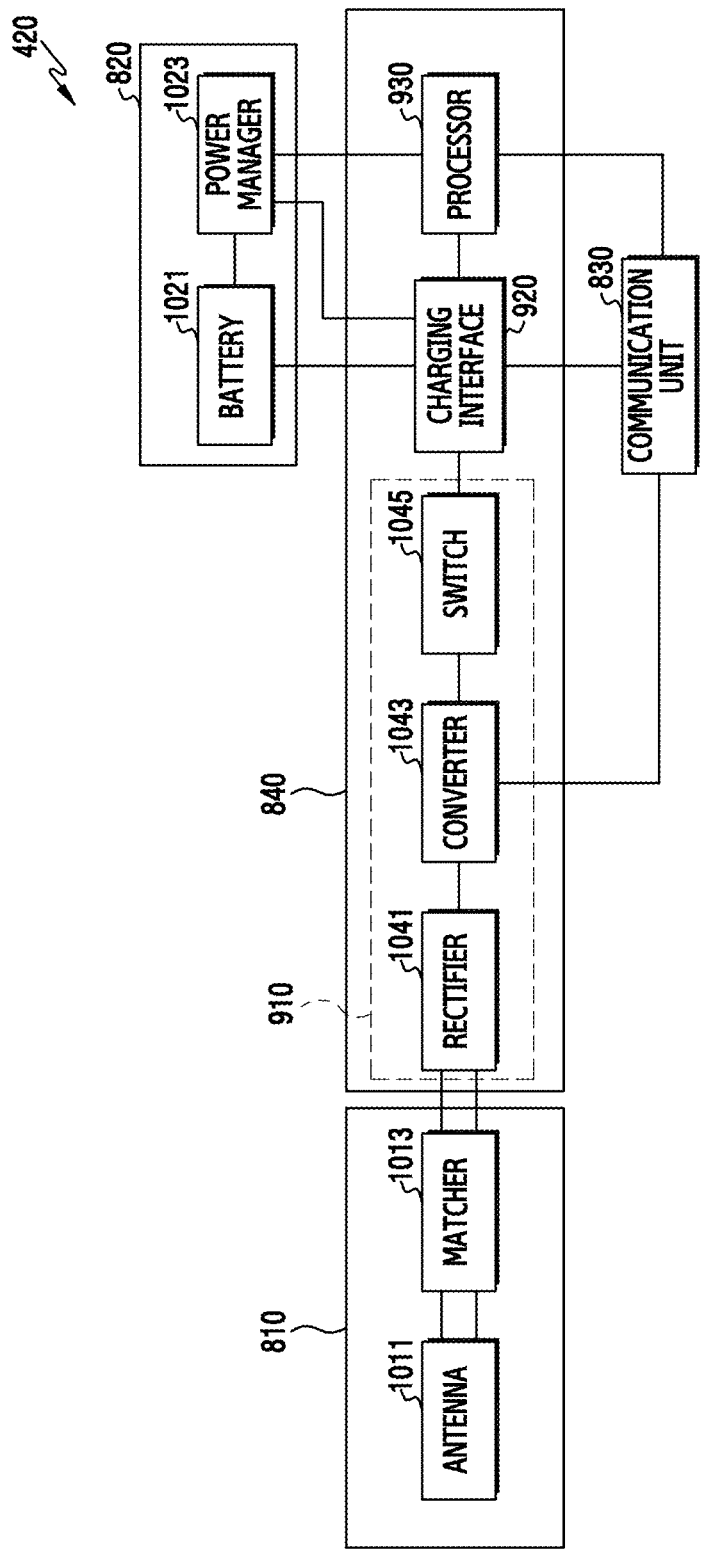
FIG. 10 is a block diagram illustrating an example detailed configuration of an electronic device according to various example embodiments.

According to various example embodiments, the wireless power charging circuit 910 may include a rectifier 1041, a converter 1043, and a switch 1045 as illustrated in FIG. 10. The rectifier 1041 may rectify AC power into DC power. For example, the rectifier 1041 may be implemented using a bridge diode. The converter 1043 may convert the DC power according to a specified gain. For example, the converter 1043 may convert the DC power to make the voltage of an output terminal be 5V. The switch 1045 may control a connection between the converter 1043 and the charging interface 920.

The charging interface 920 may include circuitry to receive power from the wireless power charging circuit 910 and provide a supply path of the power. In this example, the charging interface 920 may provide the supply path of the power under control of the wireless power charging circuit 910. According to an example embodiment, when the reception method of the electronic device 420 is the resonance method, the charging interface 920 may provide the supply path of the power to at least one of the power storage 820 or the communication unit 830. According to another example embodiment, when the reception method of the electronic device 420 is the electromagnetic induction method, the charging interface 920 may provide the supply path of the power to the power storage 820.

The processor 930 may include various processing circuitry configured to perform various functions. To achieve this, the processor 930 may receive instructions or data from the elements of the electronic device 420 and process the instructions or data. For example, the processor 930 may be an Application Processor (AP).

According to various example embodiments, the wireless power charging circuit 910 may detect power of a signal in a non-power reception mode from the power receiver, change an impedance to set the detected power to be within a predetermined range, and generate a limitation signal. For example, the operation of changing the impedance may include an operation of delivering power or a signal to the communication unit by detecting a beacon signal. The wireless power charging circuit 910 may deliver power to a battery or a system, and change the impedance. The operation of generating the limitation signal (for example, LPM, CHG_DET) may be an operation of generating a signal indicating whether the electronic device 20 is charged or not when power is transmitted. The power delivery control may be an operation of recognizing an uncharged state when the charging interface 920 supplies power to the battery in the power-save mode 610 (for example: setting CHG_DET to LOW (for example, disable)). When the uncharged state is set when power is supplied, the power delivery control_may be an operation of recognizing a charged state and setting (for example, setting GHG_DET to HIGH (for example, enable)) in the low-power transfer mode 620 or the charging operation mode 625.

FIG. 10 is a block diagram illustrating example details of an example configuration of the electronic device 420 according to various example embodiments.

Referring to FIG. 10, the power receiver 810 may include various power receiving circuitry, such as, for example, and without limitation, an antenna 1011 and a matcher 1013. The antenna 1011 may receive an electromagnetic wave. In this example, the antenna 1011 may include at least one coil. For example, according to the reception method of the electronic device 420, the shape and size of the coil may be determined. The matcher 1013 may include various circuitry provided to perform matching between the antenna 1011 and the controller 840. In this example, the matcher 1013 may be provided to perform impedance matching between the antenna 1011 and the controller 840. For example, the matcher 1013 may be connected to both ends of the coil. In addition, the matcher 1013 may include at least one capacitor.

According to various example embodiments, the power storage 820 may include a battery 1021 and a power manager 1023 as illustrated in FIG. 10. The battery 1021 may store power. The power manager 1023 may manage power wirelessly received. In addition, the power manager 1023 may manage power stored in the battery 1021. In addition, the power manager 1023 may supply power to drive the electronic device 420. For example, the power manager 1023 may individually supply power to the elements in the electronic device 420.

The electronic device 420 according to various example embodiments may include the power receiver 810 configured to wirelessly receive power, the power storage 820 configured to store the power, and the controller 840 functionally connected to the power receiver 810 and the power storage 820.

According to various example embodiments, the controller 840 may further be configured to wirelessly receive detection power for detecting the electronic device 420, deliver the detection power to the power storage 820, and generate a limitation signal related to the detection power.

According to various example embodiments, the controller 830 may further be configured to set a reference value for storing power in the power storage 820.

According to various example embodiments, the reference value may be set to be less than or equal to a limit value allowed in the power storage 820.

According to various example embodiments, the controller 840 may further be configured to supply the received power to the power storage 820 based on the reference value.

According to various example embodiments, when the power stored in the power storage 820 reaches the limit value, the controller 840 may further be configured to remove limitation on the power storage 820.

According to various example embodiments, the controller 840 may include the wireless power charging circuit 910 configured to receive the power from the power receiver 810 and determine a supply path of the power, and a charging interface 920 configured to provide the power based on the supply path.

According to various example embodiments, the wireless power charging circuit 910 may further be configured to receive the power from the power receiver 810, output a limitation signal to the charging interface 920, and transmit the power to the charging interface 920. The limitation signal may be a signal informing whether generated power is passed to the charging interface 920 or not when a long beacon is received (for example, in the low-power transfer mode of the external device).

According to various example embodiments, the charging interface 920 may further be configured to receive the limitation signal from the wireless power charging circuit 910, receive the power from the wireless power charging circuit 910, and transmit the power based on the supply path.

According to various example embodiments, the electronic device 420 may further include the communication unit 830 comprising communication circuitry configured to communicate with the external device 410 which transmits the power.

According to various example embodiments, the controller 840 may further be configured to supply the power to the communication unit 830.

According to various example embodiments, the power receiver 810 may further be configured to receive capability of the external device 410 transmitting the power.

An electronic device according to various example embodiments may include a power receiver configured to wirelessly receive power, a power storage configured to store the power, a communication unit comprising communication circuitry configured to communicate with an external device, and a controller electrically connected to the power receiver, the communication unit, and the power storage, and the controller may detect power of a signal in a non-power reception mode from the power receiver, change an impedance to set the detected power to be within a predetermined range, and generate a limitation signal.

Figure 11:
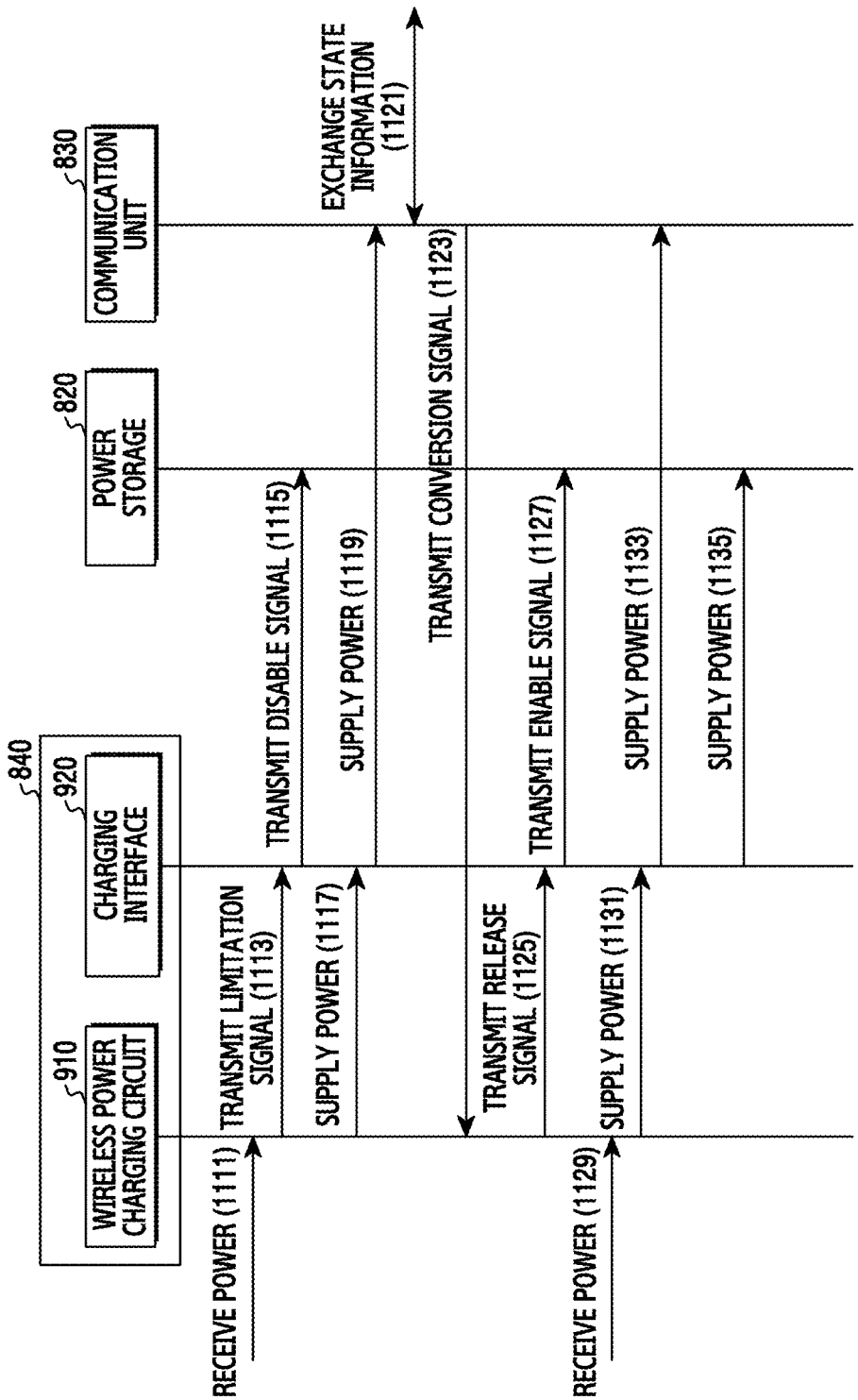
FIG. 11 is a sequence diagram illustrating an example method of operating an electronic device according to an example embodiment.

FIG. 11 is a sequence diagram illustrating an example method of operating the electronic device 420 according to an example embodiment. According to an example embodiment, the transmission method of the external device 410 and the reception method of the electronic device 420 may be the resonance method.

Referring to FIG. 11, the wireless power charging circuit 910 may receive power in operation 1111. The wireless power charging circuit 910 may receive the power through the power receiver 810. For example, in the charging standby mode 515, the power receiver 810 may wirelessly receive detection power. That is, the power receiver 810 may receive the detection power within a specified distance from the external device 410. In addition, the power receiver 810 may deliver the detection power to the wireless power charging circuit 910. Through this, the wireless power charging circuit 910 may receive the detection power from the power receiver 810.

When the power is received in operation 1111, the wireless power charging circuit 910 may transmit a limitation signal to the charging interface 920 using the detection power in operation 1113. The limitation signal may refer, for example, to a signal for determining a supply path of power. In the charging standby mode 515, the wireless power charging circuit 910 may be operated by the detection power. In addition, the wireless power charging circuit 910 may output the limitation signal to the charging interface 920. The limitation signal may be a signal informing whether generated power is passed to the charging interface 920 when a long beacon is received (for example, the low-power transfer mode).

When the limitation signal is received in operation 1113, the charging interface 920 may transmit a disable signal to the power storage 820 in operation 1115. The disable signal may refer, for example, to a signal for notifying whether the charging interface 920 supplies power to the power storage 820 or not. The disable signal may be a signal for notifying that power is not supplied to the power storage 820 or sufficient power is not supplied. For example, in the low-power transfer mode, the power may be delivered to the power storage 820, but the disable signal may indicate that charging is not normal.

After the limitation signal is transmitted in operation 1113, the wireless power charging circuit 910 may supply power to the charging interface 920 in operation 1117. For example, in the charging standby mode 515, the wireless power charging circuit 910 may supply detection power to the charging interface 920. Through this, in response to the detection power, a load change may occur in the electronic device 420. Accordingly, in the power-save mode 510, the external device 410 may detect the load change based on the detection power and detect the electronic device 420.

When the power is received in operation 1117, the charging interface 920 may supply power to the communication unit 830 or the power storage 820 in operation 1119. For example, the charging interface 920 may supply an IO voltage input rather than supplying operation power to the communication unit 830. The charging interface 920 may supply power to the power storage 820. For example, in the charging standby mode 515, the charging interface 920 may supply the detection power to the communication unit 830 or the power storage 820. In addition, the charging interface 920 may supply a specified amount of detection power to the communication unit 830, and may supply the remaining amount of detection power to the power storage 820. For example, the charging interface 920 may supply power to the power storage 820 based on a reference value which is set according to the power storage 820.

When the power is received in operation 1119, the communication unit 830 may exchange state information with the external device 410 in operation 1121. The communication unit 830 may transmit the state information of the electronic device 420 and receive the state information of the external device 410. For example, the state information may indicate capability to wirelessly charge. In the charging standby mode 515, the communication unit 830 may be operated based on the detection power. In addition, the charging operation mode 525, the communication unit 830 may exchange the state information with the external device 410. To achieve this, when the electronic device 420 is turned off or power pre-stored in the power storage 820 is less than or equal to a specified threshold, the communication unit 830 may be driven using the detection power. When the electronic device 420 is turned on, the communication unit 830 may be driven using the power pre-stored in the power storage 820.

After exchanging the state information with the external device 410 in operation 1121, the communication unit 830 may transmit a conversion signal to the wireless power charging circuit 910 in operation 1123. The conversion signal may refer, for example, to a signal for notifying that the communication unit 830 is operated. The conversion signal may refer, for example, to a signal for converting supply of power. For example, in the low-power reception mode 533, the communication unit 830 may transmit the conversion signal to the wireless power charging circuit 910. The communication unit 830 may transmit the conversion signal to the wireless power charging circuit 910 through an Inter Integrated Circuit (I2C) interface.

When the conversion signal is received in operation 1123, the wireless power charging circuit 910 may transmit a release signal to the charging interface 920 in operation 1125. The release signal may refer, for example, to a signal for converting supply of power. The release signal may be a signal for removing limitation on storing power in the power storage 820. For example, in the low-power reception mode 533, the wireless power charging circuit 910 may output the release signal to the charging interface 920.

When the release signal is received in operation 1125, the charging interface 920 may transmit an enable signal to the power storage 820 in operation 1127. The enable signal may refer, for example, to a signal for notifying whether power is supplied or not. The enable signal may be a signal for notifying that power has been supplied to the power storage 820. For example, the enable signal may be a signal which is transmitted from the charging interface 920 to the power storage 820 during a charge in the power transfer mode.

The wireless power charging circuit 910 may receive power in operation 1129. The wireless power charging circuit 910 may receive power through the power receiver 810. For example, in the power reception mode 535, the power receiver 810 may wirelessly receive charging power. For example, the power receiver 810 may receive the charging power within a specified distance from the external device 410. In addition, the power receiver 810 may deliver the charging power to the wireless power charging circuit 910. Through this, the wireless power charging circuit 910 may receive the charging power from the power receiver 810.

When the charging power is received in operation 1129, the wireless power charging circuit 910 may supply power to the charging interface 920 in operation 1131. For example, in the power reception mode 535, the wireless power charging circuit 910 may supply the charging power to the charging interface 920.

According to an example embodiment, the wireless power charging circuit 910 may determine charge state information based on the charging power. In addition, the wireless power charging circuit 910 may transmit the charge state information to the communication unit 820. For example, the charge state information may include at least one of an input voltage, an output voltage, or an output current of the charging power or temperature of the wireless power charging circuit 910. The wireless power charging circuit 910 may transmit the charge state information to the communication unit 830 through the I2C interface. When the charge state information is received, the communication unit 830 may generate an operation signal based on the charge state information. In addition, the communication unit 830 may transmit the operation signal.

When the power is received in operation 1131, the charging interface 920 may supply power to the communication unit 830 in operation 1133 and supply power to the power storage 820 in operation 1135. For example, in the power reception mode 535, the charging interface 920 may supply a specified amount of driving power to the communication unit 830. Through this, the communication unit 830 may continue to be driven using the specified amount of driving power. In addition, in the power reception mode 535, the charging interface 920 may supply the remaining amount of driving power to the power storage 820. Through this, the power storage 820 may store the remaining amount of driving power.

Figure 12:
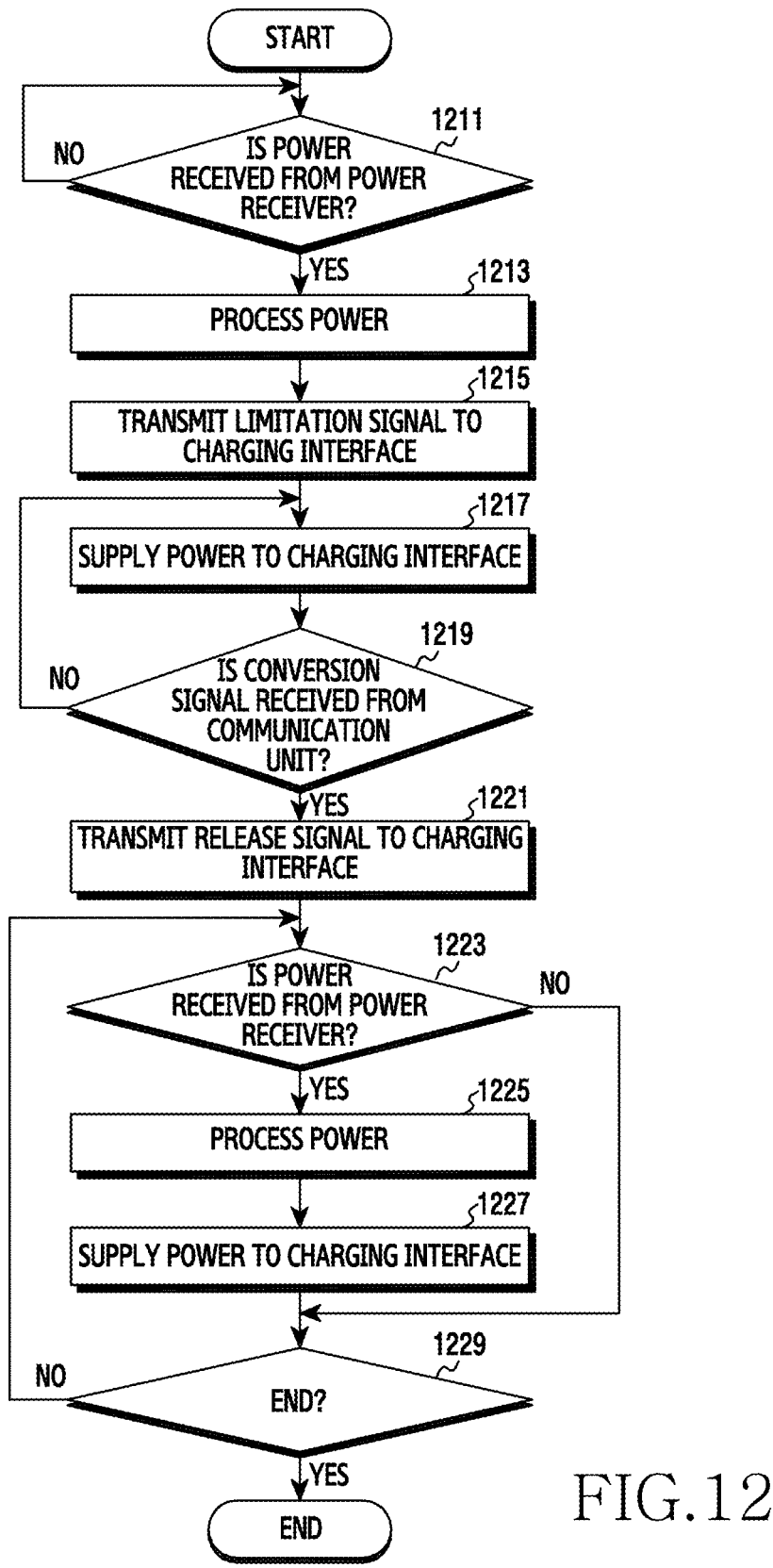
FIG. 12 is a flowchart illustrating an example method of operating a charging controller according to an example embodiment.

FIG. 12 is a flowchart illustrating an example method of operating the wireless power charging circuit 910 according to an example embodiment.

Referring to FIG. 12, the wireless power charging circuit 910 may receive power from the power receiver 810 in operation 1211. The wireless power charging circuit 910 may receive power through the power receiver 810. The wireless power charging circuit 910 may receive AC power from the power receiver 810. For example, in the charging standby mode 515, the power receiver 810 may wirelessly receive detection power. That is, the power receiver 810 may receive the detection power within a specified distance from the external device 410. In addition, the power receiver 810 may deliver the detection power to the wireless power charging circuit 910. Through this, the wireless power charging circuit 910 may receive the detection power from the power receiver 810.

The wireless power charging circuit 910 may process the power in operation 1213. The wireless power charging circuit 910 may process the AC power into DC power. For example, in the charging standby mode 515, the wireless power charging circuit 910 may be operated by the detection power. In addition, the rectifier 1041 may rectify the AC power into DC power. In addition, the converter 1043 may convert the DC power according to a specified gain.

The wireless power charging circuit 910 may transmit a limitation signal to the charging interface 920 in operation 1215. The limitation signal may refer, for example, to a signal for determining a supply path of power. For example, the switch 1045 may transmit the limitation signal to the charging interface 920. The wireless power charging circuit 910 may supply power to the charging interface 920 or the power storage 820 in operation 1217. For example, in the charging standby mode 515, the wireless power charging circuit 910 may supply the detection power to the charging interface 920 or the power storage 820. Through this, a load change may occur in the electronic device 420 in response to the detection power. Accordingly, in the power-save mode 510, the external device 410 may detect the load change based on the detection power and detect the electronic device 420.

When a conversion signal is received from the communication unit 830, the wireless power charging circuit 910 may detect the conversion signal in operation 1219. In addition, the wireless power charging circuit 910 may transmit a release signal to the charging interface 920 in operation 1221. The release signal may refer, for example, to a signal for determining a supply path of power. The release signal may be a signal for removing limitation on storing power in the power storage 820. For example, in the low-power reception mode 533, the wireless power charging circuit 910 may output the release signal to the charging interface 920.

The wireless power charging circuit 910 may receive power in operation 1223. The wireless power charging circuit 910 may receive power through the power receiver 810. For example, in the power reception mode 535, the power receiver 810 may wirelessly receive charging power. For example, the power receiver 810 may receive the charging power within a specified distance from the external device 410. In addition, the power receiver 810 may deliver the charging power to the wireless power charging circuit 910. Through this, the wireless power charging circuit 910 may receive the charging power from the power receiver 810.

The wireless power charging circuit 910 may process the power in operation 1225. The wireless power charging circuit 910 may process AC power into DC power. For example, the rectifier 1041 may rectify AC power into DC power. In addition, the converter 1043 may convert the DC power according to a specified gain.

The wireless power charging circuit 910 may supply power to the charging interface 920 in operation 1227. For example, in the power reception mode 535, the wireless power charging circuit 910 may supply charging power to the charging interface 920.

According to an example embodiment, the wireless power charging circuit 910 may determine charge state information based on the charging power. In addition, the wireless power charging circuit 910 may transmit the charge state information to the communication unit 830. For example, the charge state information may include at least one of an input voltage, an output voltage, or an output current of the charging power or temperature of the wireless power charging circuit 910 according to the wireless power charging circuit 910. The wireless power charging circuit 910 may transmit the charge state information to the communication unit 830 through electrically connected communication or serial communication. For example, an example of a communication path may be an I2C interface.

According to another example embodiment, the wireless power charging circuit 910 may transmit notification information indicating that the electronic device is being charged to the processor 930 based on the charging power. The power storage 820 or the charging interface 920 may transmit the notification information to the processor 930. In this example, the notification information may include charge state information. Through this, the processor 930 may output display data or audio data for notifying that the electronic device is being charged based on the notification information. For example, the display data may include at least one of an icon, a text, or color light.

When the reception of the power is ended, the wireless power charging circuit 910 may detect the end of the reception of the power in operation 1229. Through this, the operation of the wireless power charging circuit 910 may be ended. On the other hand, when the reception of the power is not ended, the wireless power charging circuit 910 may repeat operations 1223 to 1229. Through this, the wireless power charging circuit 910 may continue to receive power through the power receiver and supply power to the charging interface 920.

Figure 13:
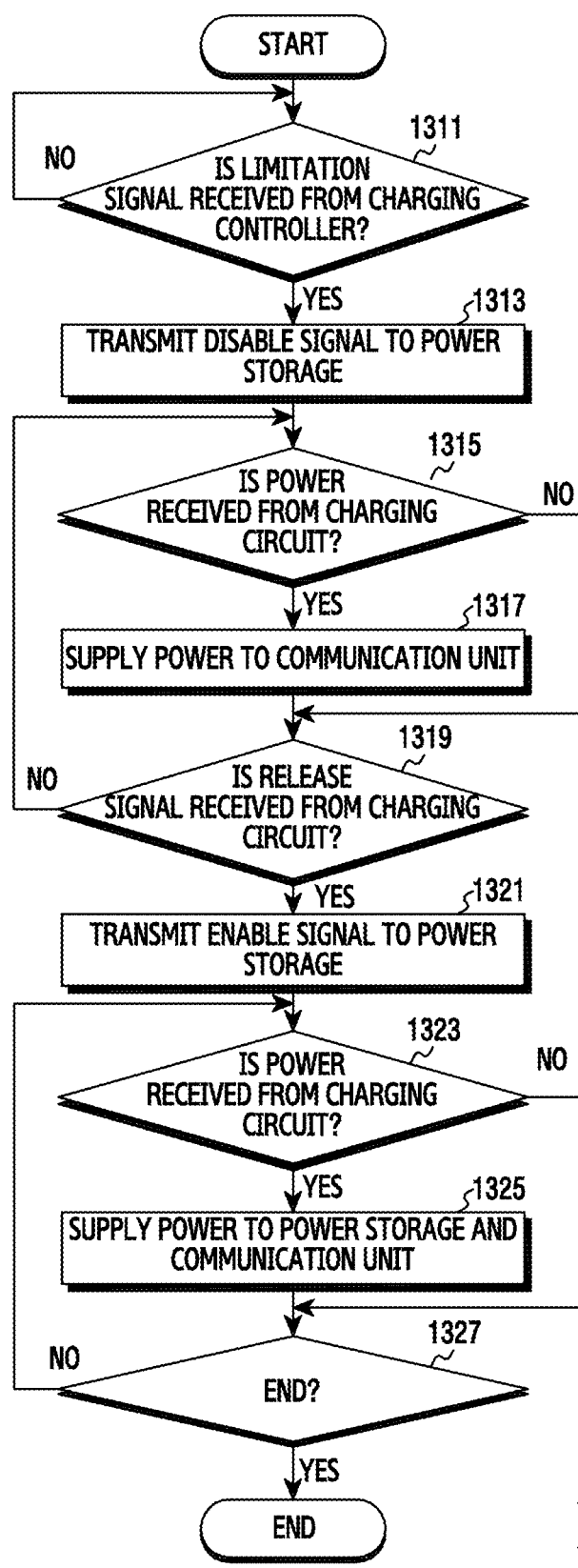
FIG. 13 is a flowchart illustrating an example method of operating a charging interface according to an example embodiment.

FIG. 13 is a flowchart illustrating an example method of operating the charging interface 920 according to an example embodiment.

Referring to FIG. 13, the charging interface 920 may receive a limitation signal from the wireless power charging circuit 910 in operation 1311. The limitation signal may refer, for example, to a signal for determining a supply path of power. For example, in the charging standby mode 515, the charging interface 920 may receive the limitation signal from the wireless power charging circuit 910.

The charging interface 920 may transmit a disable signal to the power storage 820 in operation 1313. The disable signal may refer, for example, to a signal for notifying whether power is supplied or not. The disable signal may be a signal for notifying that power is not supplied to the power storage 820 or sufficient power is not supplied.

The charging interface 920 may receive power from the wireless power charging circuit 910 in operation 1315. For example, in the charging standby mode 515, the charging interface 920 may receive detection power from the wireless power charging circuit 910. Through this, a load change may occur in the electronic device 420 in response to the detection power. Accordingly, in the power-save mode 510, the external device 410 may detect the load change based on the detection power and may detect the electronic device 420.

The charging interface 920 may supply power to the communication unit 830 in operation 1317. For example, in the charging standby mode 515, the charging interface 920 may supply the detection power to the communication unit 830. For example, the charging interface 920 may not supply the detection power to the power storage 820 and may supply the detection power to the communication unit 830. The charging interface 920 may supply a specified amount of detection power to the communication unit 830 and supply the remaining amount of detection power to the power storage 820.

The charging interface 920 may receive a release signal from the wireless power charging circuit 910 in operation 1319. The release signal may refer, for example, to a signal for determining a supply path of power. The release signal may be a signal for removing limitation on storing power in the power storage 820. For example, in the low-power reception mode 533, the charging interface 920 may receive the release signal from the wireless power charging circuit 910.

The charging interface 920 may transmit an enable signal to the power storage 820 in operation 1321. The enable signal may refer, for example to a signal for notifying whether supply power is supplied or not. The enable signal may be a signal for notifying that power has been supplied to the power storage 820.

The charging interface 920 may receive power from the wireless power charging circuit 910 in operation 1323. The charging interface 920 may receive DC power from the wireless power charging circuit 910. For example, in the power reception mode 535, the charging interface 920 may receive driving power from the wireless power charging circuit 910.

The charging interface 920 may supply power to the power storage 820 and the communication unit 830 in operation 1325. For example, in the power reception mode 535, the charging interface 920 may supply a specified amount of driving power to the communication unit 830. Through this, the communication unit 830 may be continuously driven using the specified amount of driving power. In addition, in the power reception mode 535, the charging interface 920 may supply the remaining amount of driving power to the power storage 820. Through this, the power storage 820 may store the remaining amount of driving power.

When the reception of the power is ended, the charging interface 920 may detect the end of the reception of the power in operation 1327. Through this, the operation of the charging interface 920 may be ended. On the other hand, when the reception of the power is not ended, the charging interface 920 may repeat operations 1323 to 1327. Through this, the charging interface 920 may continue to receive power from the wireless power charging circuit 910 and supply power to the power storage 820 and the communication unit 830.

Figure 14:
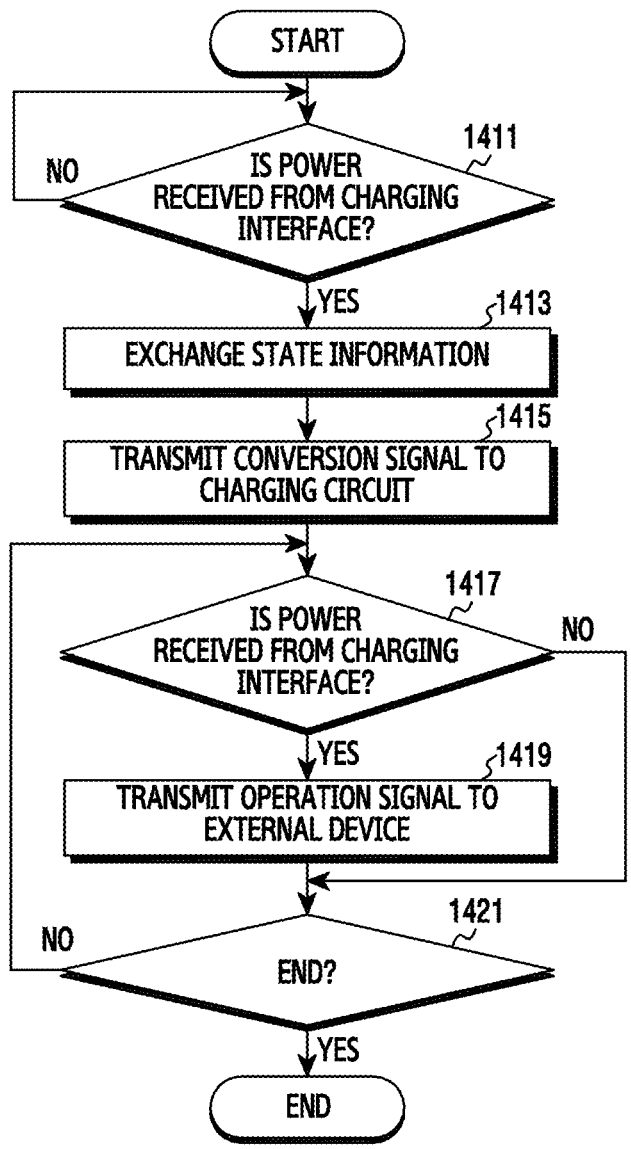
FIG. 14 is a flowchart illustrating an example method of operating a communication unit according to an example embodiment.

FIG. 14 is a flowchart illustrating an example method of operating the communication unit 830 according to various example embodiments.

Referring to FIG. 14, the communication unit 830 may receive power from the charging interface 920 in operation 1411. For example, in the charging standby mode 515, the communication unit 830 may receive detection power from the charging interface 920. Through this, the communication unit 830 may be operated based on the detection power.

The communication unit 830 may exchange state information with the external device 410 in operation 1413. The communication unit 830 may transmit the state information of the electronic device 420 and receive the state information of the external device 410. For example, the state information may indicate capability to wirelessly charge. For example, in the charging operation mode 525, the communication unit 830 may exchange the state information with the external device 410. To achieve this, when the electronic device 420 is turned off or power pre-stored in the power storage 820 is less than or equal to a specified threshold, the communication unit 830 may be driven using the detection power. Alternatively, when the electronic device 420 is turned on, the communication unit 830 may be driven using power pre-stored in the power storage 820.

The communication unit 830 may transmit a conversion signal to the wireless power charging circuit 910 in operation 1415. The conversion signal may refer, for example, to a signal for notifying that the communication unit 830 is operated. The conversion signal may refer, for example, to a signal for converting supply of power. For example, in the low-power reception mode 533, the communication unit 830 may transmit the conversion signal to the wireless power charging circuit 910. The communication unit 830 may transmit the conversion signal to the wireless power charging circuit 910 through the I2C interface.

The communication unit 830 may receive power from the charging interface 920 in operation 1417. For example, in the power reception mode 535, the communication unit 830 may receive charging power from the charging interface 920. Through this, the communication unit 830 may be driven based on the charging power.

According to an example embodiment, the communication unit 830 may receive charge state information from the wireless power charging circuit 910. For example, the charge state information may include at least one of an input voltage, an output voltage, or an output current of the charging power or temperature of the wireless power charging circuit 910 according to the wireless power charging circuit 910. The communication unit 830 may transmit the charge state information to the wireless power charging circuit 910 through the I2C interface.

The communication unit 830 may transmit an operation signal to the external device 410 in operation 1419. To achieve this, the communication unit 830 may generate the operation signal based on the charge state information. For example, in the power reception mode 535, the communication unit 830 may transmit the operation signal.

When the reception of the power is ended, the communication unit 830 may detect the end of the reception of the power in operation 1421. Through this, the operation of the communication unit 830 may be ended. On the other hand, when the reception of the power is not ended, the communication unit 830 may repeat operations 1417 to 1421. Through this, the communication unit 830 may continue to receive power from the charging interface 920 and transmit the operation signal in specified output periods.

Figure 15:
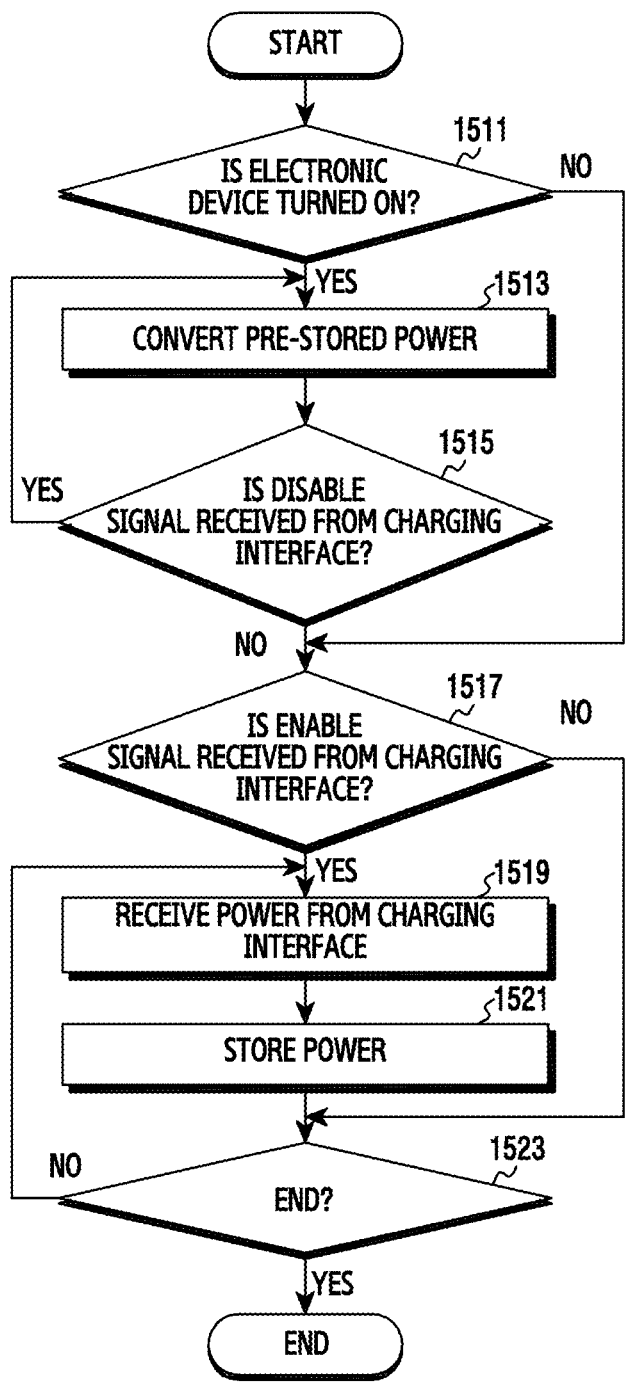
FIG. 15 is a flowchart illustrating an example method of operating a power storage according to an example embodiment.

FIG. 15 is a flowchart illustrating an example method of operating the power storage 820 according to an example embodiment.

Referring to FIG. 15, the power storage 820 may detect the on-state of the electronic device 420 in operation 1511. In addition, the power storage 820 may convert pre-stored power in operation 1513. For example, the power manager 1023 may convert power pre-stored in the battery 1021. Through this, the power manager 1023 may supply power to drive the electronic device 420. For example, the power manager 1023 may individually supply power to the elements in the electronic device 420.

When a disable signal is received from the charging interface 920, the power storage 820 may detect the disable signal in operation 1515. The disable signal may be defined as a signal for notifying whether power is supplied or not. According to an example embodiment, the disable signal may refer, for example, to a signal for notifying that power is not supplied to the power storage 820 or sufficient power is not supplied. For example, in the charging standby mode 515, the power storage 820 may receive the disable signal from the charging interface 920. In addition, the power storage 820 may return to operation 1513. For example, the power storage 820 may continue to convert pre-stored power.

When an enable signal is received from the charging interface 920, the power storage 820 may detect the enable signal in operation 1517. The enable signal refer, for example, to a signal for notifying whether power is supplied or not. The enable signal may refer, for example, to a signal for notifying that power has been supplied to the power storage 820. For example, in the low-power reception mode 533, the power storage 820 may receive the enable signal from the charging interface 920. In addition, the power storage 820 may receive power from the charging interface 920 in operation 1519. For example, in the power reception mode 535, the power storage 820 may receive charging power from the charging interface 920.

The power storage 820 may store power in operation 1521. For example, in the power reception mode 535, the battery 1021 may store charging power. In this example, the power storage 820 may convert pre-stored power. For example, the power manager 1023 may convert the power pre-stored in the battery 1021. The power storage 820 may convert charging power. Through this, the power manager 1023 may supply power to drive the electronic device 420. For example, the power manager 1023 may individually supply power to the elements in the electronic device 420.

When the reception of the power is ended, the power storage 820 may detect the end of the reception of the power in operation 1523. Through this, the operation of the power storage 820 may be ended. On the other hand, when the reception of the power is not ended, the power storage 820 may repeat operations 1519 to 1523. Through this, the power storage 820 may continue to receive power from the charging interface 920 and store the power.

In operation 1511, when the on-state of the electronic device 420 is not detected and the electronic device 420 is turned off or power pre-stored in the power storage 820 is less than or equal to a specified threshold, the power storage 820 may proceed to operation 1517. In addition, the power storage 820 may perform at least some of operations 1517 to 1523.

Figure 16:
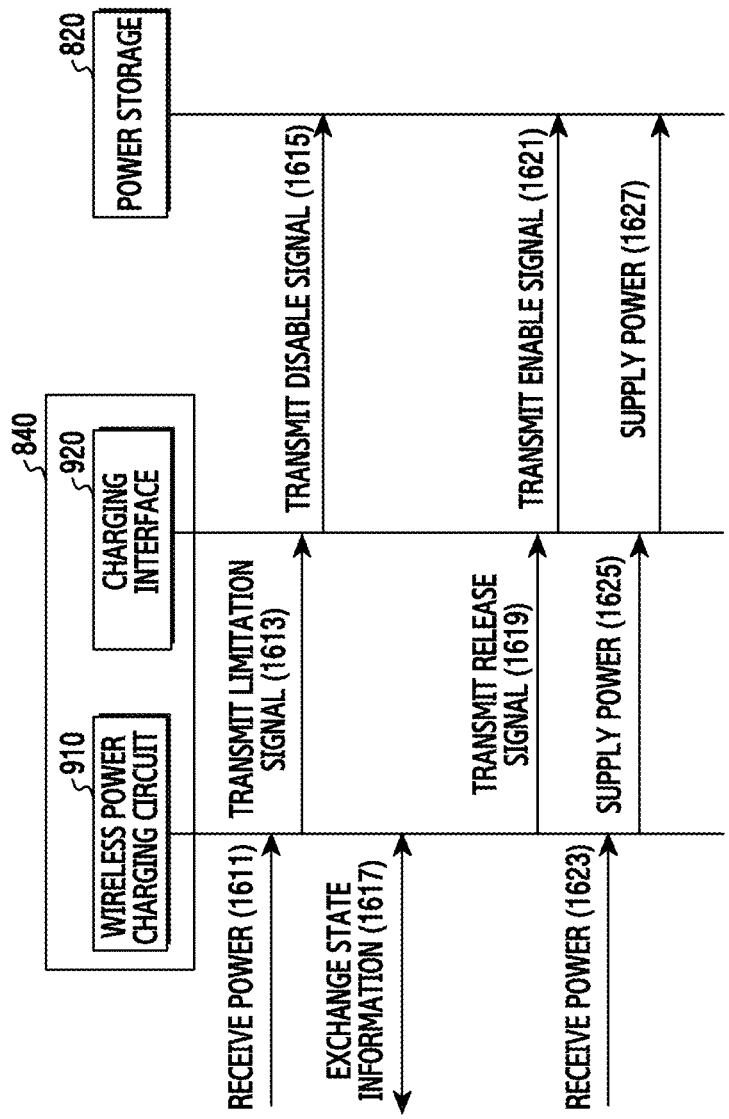
FIG. 16 is a sequence diagram illustrating an example method of operating an electronic device according to another example embodiment.
Figure 17:
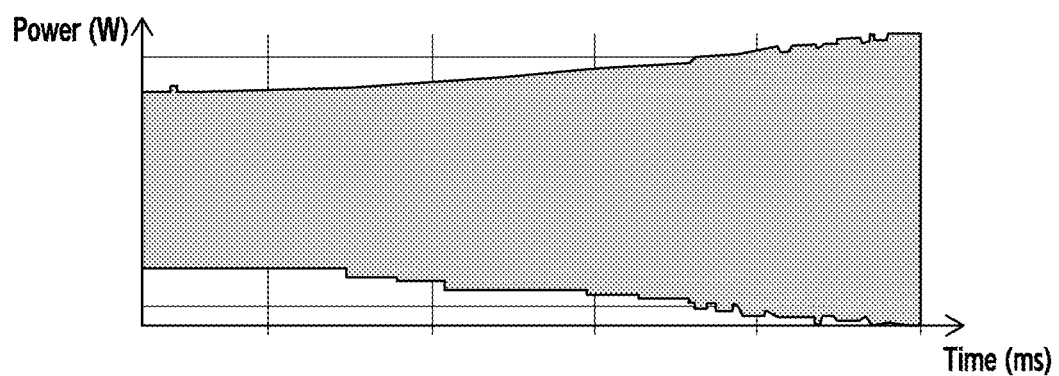
FIG. 17 is a diagram illustrating an example method of operating a power receiver according to another example embodiment.

FIG. 16 is a sequence diagram illustrating an example method of operating the electronic device 420 according to another example embodiment. FIG. 17 is a diagram illustrating examples of a method of operating the power receiver 810 according to another example embodiment. According to another example embodiment, the transmission method of the external device 410 and the reception method of the electronic device 420 may be the electromagnetic induction method.

Referring to FIG. 16, the wireless power charging circuit 910 may receive power in operation 1611. The wireless power charging circuit 910 may receive power through the power receiver 810. The power may be delivered with a structure as illustrated in FIG. 17. For example, in the charging standby mode 515, the power receiver 810 may wirelessly receive detection power. That is, the power receiver 810 may receive the detection power within a specified distance from the external device 410. In addition, the power receiver 810 may deliver the detection power to the wireless power charging circuit 910. Through this, the wireless power charging circuit 910 may receive the detection power from the power receiver 810.

When the power is received in operation 1611, the wireless power charging circuit 910 may transmit a limitation signal to the charging interface 920 using the detection power in operation 1613. The limitation signal may refer, for example, to a signal for determining a supply path of power. For example, in the charging standby mode 515, the wireless power charging circuit 910 may be operated by the detection power. In addition, the wireless power charging circuit 910 may output the limitation signal to the charging interface 920.

When the limitation signal is received in operation 1613, the charging interface 920 may transmit a disable signal to the power storage 820 in operation 1615. The disable signal may refer, for example, to a signal for notifying whether power is supplied or not. The disable signal may be a signal for notifying that power is not supplied to the power storage 820 or sufficient power is not supplied. After transmitting the limitation signal in operation 1613, the wireless power charging circuit 910 may exchange state information with the external device 410 in operation 1617. The wireless power charging circuit 910 may transmit the state information of the electronic device 420 and receive the state information of the external device 410 through the power receiver 810. For example, the state information may indicate capability to wirelessly charge. In the charging standby mode 515, the wireless power charging circuit 910 may be operated based on the detection power. To achieve this, when the electronic device 420 is turned off or power pre-stored in the power storage 820 is less than or equal to a specified threshold, the wireless power charging circuit 910 may be driven using the detection power. Alternatively, when the electronic device 420 is turned on, the wireless power charging circuit 910 may be driven using power pre-stored in the power storage 820.

After exchanging state information with the external device 410 in operation 1617, the wireless power charging circuit 910 may transmit a release signal to the charging interface 920 in operation 1619. The release signal may refer, for example, to a signal for determining a supply path of power. The release signal may be a signal for removing limitation on storing power in the power storage 820. For example, in the low-power reception mode 525, the wireless power charging circuit 910 may output the release signal to the charging interface 920.

When the release signal is received in operation 1619, the charging interface 920 may transmit an enable signal to the power storage 820 in operation 1621. The enable signal may refer, for example, to a signal for notifying whether power is supplied or not. The enable signal may be a signal for notifying that power is supplied to the power storage 820.

The wireless power charging circuit 910 may receive power in operation 1623. The wireless power charging circuit 910 may receive power through the power receiver 810. For example, in the low-power reception mode 533 and the power reception mode 535, the power receiver 810 may wirelessly receive charging power. For example, the power receiver 810 may receive the charging power within a specified distance from the external device 410. In addition, the power receiver 810 may deliver the charging power to the wireless power charging circuit 910. Through this, the wireless power charging circuit 910 may receive the charging power from the power receiver 810.

When the charging power is received in operation 1623, the wireless power charging circuit 910 may supply power to the charging interface 920 in operation 1625. For example, in the low-power reception mode 533 and the power reception mode 535, the wireless power charging circuit 910 may supply the charging power to the charging interface 920.

When the power is received in operation 1625, the charging interface 920 may supply power to the power storage 820 in operation 1627. For example, in the low-power reception mode 533, the charging interface 920 may supply power to the power storage 820 based on a reference value which is set according to the power storage 820. In addition, when the power stored in the power storage 820 reaches a limit value, the charging interface 920 may disregard the limit value and supply power to the power storage 820. For example, in the power reception mode 535, the charging interface 920 may remove limitation on the power storage 820.

Figure 18:
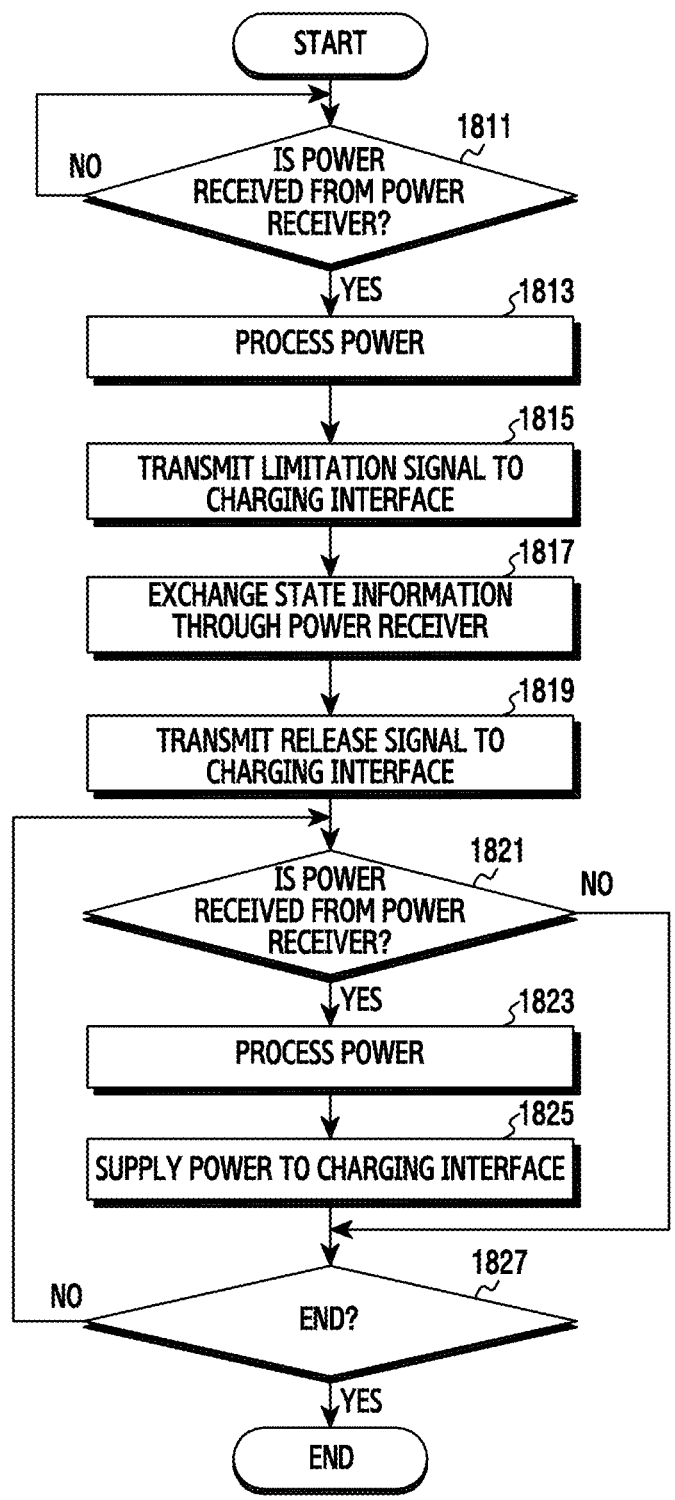
FIG. 18 is a flowchart illustrating an example method of operating a charging controller according to another example embodiment.

FIG. 18 is a flowchart illustrating an example method of operating the wireless power charging circuit 910 according to another example embodiment.

Referring to FIG. 18, the wireless power charging circuit 910 may receive power from the power receiver 810 in operation 1811. The wireless power charging circuit 910 may receive power through the power receiver 810. The wireless power charging circuit 910 may receive AC power from the power receiver 810. For example, in the charging standby mode 515, the power receiver 810 may wirelessly receive detection power. For example, the power receiver 810 may detect the detection power within a specified distance from the external device 410. In addition, the power receiver 810 may deliver the detection power to the wireless power charging circuit 910. Through this, the wireless power charging circuit 910 may receive the detection power from the power receiver 810.

The wireless power charging circuit 910 may process the power in operation 1813. The wireless power charging circuit 910 may process the AC power into DC power. For example, in the charging standby mode 515, the wireless power charging circuit 910 may be operated by the detection power. In addition, the rectifier 1041 may rectify the AC power into DC power. In addition, the converter 1043 may convert the DC power according to a specified gain.

The wireless power charging circuit 910 may transmit a limitation signal to the charging interface 920 in operation 1815. The limitation signal may refer, for example, to a signal for determining a supply path of power. For example, the switch 1045 may transmit the limitation signal to the charging interface 920.

The wireless power charging circuit 910 may exchange state information with the external device 410 through the power receiver 810 in operation 1817. The wireless power charging circuit 910 may transmit the state information of the electronic device 420 and receive the state information of the external device 410 through the power receiver 810. For example, the state information may indicate capability to wirelessly charge. In the charging standby mode 515, the wireless power charging circuit 910 may be operated based on the detection power. In addition, in the power reception mode 533, the wireless power charging circuit 910 may exchange state information with the external device 410.

The wireless power charging circuit 910 may transmit a release signal to the charging interface 920 in operation 1819. The release signal may refer, for example, to a signal for determining a supply path of power. The release signal may be a signal for removing limitation on storing power in the power storage 820. For example, in the low-power reception mode 533, the wireless power charging circuit 910 may output the release signal to the charging interface 920.

The wireless power charging circuit 910 may receive power in operation 1821. The wireless power charging circuit 910 may receive power through the power receiver 810. For example, in the power reception mode 535, the power receiver 810 may wirelessly receive charging power. That is, the power receiver 810 may receive charging power within a specified distance from the external device 410. In addition, the power receiver 810 may deliver the charging power to the wireless power charging circuit 910. Through this, the wireless power charging circuit 910 may receive the charging power from the power receiver 810.

The wireless power charging circuit 910 may process power in operation 1823. The wireless power charging circuit 910 may process AC power into DC power. For example, the rectifier 1041 may rectify AC power into DC power. In addition, the converter 1043 may convert the DC power according to a specified gain.

The wireless power charging circuit 910 may supply power to the charging interface 920 in operation 1825. For example, in the power reception mode 535, the wireless power charging circuit 910 may supply the charging power to the charging interface 920.

When the reception of the power is ended, the wireless power charging circuit 910 may detect the end of the reception of the power in operation 1827. Through this, the operation of the wireless power charging circuit 910 may be ended. On the other hand, when the reception of the power is not ended, the wireless power charging circuit 910 may repeat operations 1821 to 1827. Through this, the wireless power charging circuit 910 may continue to receive power through the power receiver 810 and supply power to the charging interface 920.

Figure 19:
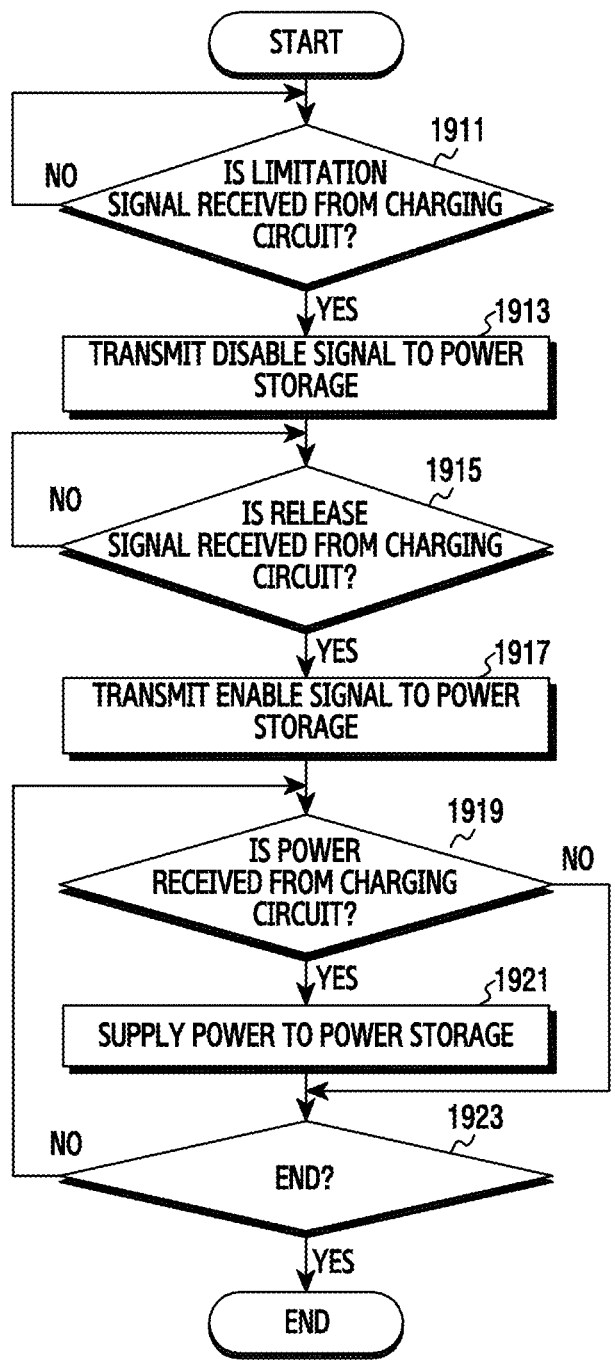
FIG. 19 is a flowchart illustrating an example method of operating a charging interface according to another example embodiment.

FIG. 19 is a flowchart illustrating an example method of operating the charging interface 920 according to another example embodiment.

Referring to FIG. 19, the charging interface 920 may receive a limitation signal from the wireless power charging circuit 910 in operation 1911. The limitation signal may refer, for example, to a signal for determining a supply path of power. For example, in the charging standby mode 515, the charging interface 920 may receive the limitation signal from the wireless power charging circuit 910.

The charging interface 920 may transmit a disable signal to the power storage 820 in operation 1913. The disable signal may refer, for example, to a signal for notifying whether power is supplied or not. The disable signal may be a signal for notifying that power is not supplied to the power storage 820 or sufficient power is not supplied.

The charging interface 920 may receive a release signal from the wireless power charging circuit 910 in operation

1915. The release signal may refer, for example, to a signal for determining a supply path of power. The release signal may be a signal for removing limitation on storing power in the power storage 820. For example, in the low-power reception mode 533, the charging interface 920 may receive the release signal from the wireless power charging circuit 910.

The charging interface 920 may transmit an enable signal to the power storage 820 in operation 1917. The enable signal may refer, for example, to a signal for notifying whether power is supplied or not. The enable signal may be a signal for notifying that power has been supplied to the power storage 820.

The charging interface 920 may receive power from the wireless power charging circuit 910 in operation 1919. The charging interface 920 may receive DC power from the wireless power charging circuit 910. In addition, the charging interface 920 may supply power to the power storage 820 in operation 1921.

When the reception of the power is ended, the charging interface 920 may detect the end of the reception of the power in operation 1923. Through this, the operation of the charging interface 920 may be ended. On the other hand, when the reception of the power is not ended, the charging interface 920 may repeat operations 1919 to 1923. Through this, the charging interface 920 may continue to receive power through the wireless power charging circuit 910 and supply power to the power storage 820.

The method of operating the power storage 820 according to another example embodiment is similar to the operating method of the power storage 820 according to the above-described embodiment, and thus a repeated detailed description thereof is omitted.

According to various example embodiments, the method of operating the electronic device 420 may include: wirelessly receiving detection power for detecting the electronic device 420; delivering the detection power to a power storage of the electronic device 420; and generating a limitation signal related to the detection power.

According to various example embodiments, the electronic device 420 may include the power storage 820 configured to store power.

According to various example embodiments, the method of operating the electronic device 420 may further include setting a reference value for storing power in the power storage 820.

According to various example embodiments, the reference value is set to be less than or equal to a limit value which is allowed in the power storage 820.

According to various example embodiments, the method of operating the electronic device 420 may further include supplying received power to the power storage 820 based on the reference value.

According to various example embodiments, the method of operating the electronic device 420 may further include, when power stored in the power storage 820 reaches the limit value, removing a limitation on the power storage 820.

According to various example embodiments, the electronic device may include a communication unit 830 comprising communication circuitry configured to communicate with the external device 410 which transmits the power.

According to various example embodiments, the method of operating the electronic device 420 may further include supplying the power to the communication unit 830.

According to various example embodiments, the method of operating the electronic device 420 may further include receiving, by the communication unit 830, capability of the external device 410.

According to various example embodiments, the electronic device 420 may include a power receiver 810 configured to receive the power.

According to various example embodiments, the method of operating the electronic device 420 may further include receiving, by the power receiver 810, the capability of the external device 410.

A computer-readable recording media can include a hard disk, a floppy disk, a magnetic media (e.g., a magnetic tape), an optical media (e.g., a Compact Disc-Read Only Memory (CD-ROM) and/or Digital Versatile Disk (DVD)), a Magneto-Optical Media (e.g., a floptical disk), an internal memory, etc. An instruction can include a code made by a compiler or a code executable by an interpreter. A module or a program module according to various example embodiments can further include at least one or more of the aforementioned constituent elements, or omit some, or further include another constituent element. Operations carried out by a module, a program module or another constituent element according to various example embodiments can be executed in a sequential, parallel, repeated or heuristic method, or at least some operations can be executed in different order or can be omitted, or another operation can be added.

A computer-readable recording medium according to various example embodiments may store a program for executing: wirelessly receiving detection power for detecting the electronic device 420; delivering the detection power to a power storage of the electronic device 420; and generating a limitation signal related to the detection power.

The various example embodiments disclosed in the present description and drawings are merely illustrative example embodiments provided to aid in explaining the technical features and to aid in understanding, and are not intended to limit the scope of the present disclosure. Therefore, the scope of the present disclosure is defined not by the detailed description but by the appended claims, and all differences within the scope will be construed as being included in the present disclosure.

According to various example embodiments, the electronic device 420 can effectively consume detection power received from the external device 410. For example, when the external device 410 transmits a predetermined amount of detection power, the electronic device 420 may consume the detection power based on the predetermined amount of detection power. Accordingly, various problems which may arise in the external device 410 can be prevented and/or avoided. Accordingly, the external device 410 can effectively detect the electronic device 420.

What is claimed is:

1. A method of operating an electronic device, comprising:
    wirelessly receiving detection power from an external charging device which detects the electronic device in a charging standby mode;
    generating a limitation signal related to the detection power, the limitation signal regarding a limitation on the power storage;
    changing, in order for allowing the external charging device to detect the electronic device, an impedance of the electronic device by delivering the detection power to a power storage of the electronic device and/or other circuitry in the charging standby mode;

communicating with the external charging device in a charging operation mode responsive to the detection power;

after the electronic device communicates with the external charging device responsive to the detection power, sending a release signal which removes the limitation on the power storage in a low-power reception mode; and receiving a charging power from the external charging device, and charging the power storage in a power reception mode.

2. The method of claim 1,
wherein the method further comprises setting a reference value for storing power in the power storage based on the limitation signal.

3. The method of claim 2, wherein the reference value is set to be less than or equal to a limit value allowed in the power storage.

4. The method of claim 3, further comprising supplying received power to the power storage based on the reference value.

5. The method of claim 4, further comprising, removing the limitation on the power storage when power stored in the power storage reaches the limit value.

6. The method of claim 1, wherein the electronic device comprises a communication unit comprising communication circuitry configured to communicate with an external device which transmits the power, and
wherein the method further comprises supplying the detection power to the communication unit.

7. The method of claim 6, further comprising receiving, by the communication circuitry of the communication unit, capability of the external charging device.

8. The method of claim 7, wherein the electronic device comprises power receiver circuitry configured to receive the power, and
wherein the operating method further comprises receiving, by the power receiver circuitry, the capability of the external charging device.

9. An electronic device comprising:
power receiver circuitry configured to wirelessly receive power;
a power storage configured to store the power; and
a controller comprising processing circuitry functionally connected to the power receiver and the power storage, and
wherein the controller is configured to:
wirelessly receive detection power from an external charging device for detecting the electronic device in a charging standby mode,
generate a limitation signal related to the detection power, the limitation signal regarding a limitation on the power storage,
change, in order for allowing the external charging device to detect the electronic device, an impedance of the electronic device by delivering the detection power to the power storage and/or other circuitry in the charging standby mode,
communicate with the external charging device in a charging operation mode responsive to the detection power,
after the electronic device communicates with the external charging device responsive to the detection power, send a release signal for removing the limitation on the power storage in a low-power reception mode, and
receive a charging power from the external charging device, and charge the power storage in a power reception mode.

10. The electronic device of claim 9, wherein the controller is further configured to set a reference value for storing power in the power storage based on the limitation signal.

11. The electronic device of claim 10, wherein the reference value is set to be less than or equal to a limit value allowed in the power storage.

12. The electronic device of claim 11, wherein the controller is further configured to supply received power to the power storage based on the reference value.

13. The electronic device of claim 12, wherein, the controller is further configured to remove the limitation on the power storage when power stored in the power storage reaches the limit value.

14. The electronic device of claim 9, wherein the controller comprises:
a charging controller comprising processing circuitry configured to receive the power from the power receiver and determine a supply path of the power; and
a charging interface comprising interface circuitry configured to provide the power based on the supply path.

15. The electronic device of claim 14, wherein the charging controller is further configured to receive the power from the power receiver, to output a limitation signal for determining the supply path to the charging interface, and to transmit the power to the charging interface.

16. The electronic device of claim 15, wherein the charging interface is further configured to receive the limitation signal from the charging controller, to receive the power from the charging controller, and to transmit the power based on the supply path.

17. The electronic device of claim 9, further comprising a communication unit comprising communication circuitry configured to communicate with the external charging device which transmits the power, and
wherein the controller is further configured to supply the power to the communication unit.

18. The electronic device of claim 17, wherein the communication circuitry is further configured to receive capability of the external charging device.

19. The electronic device of claim 18, wherein the power receiver is further configured to receive the capability of the external charging device which transmits the power.

20. An electronic device comprising:
a power receiver comprising power receiving circuitry configured to wirelessly receive power;
a power storage configured to store the power;
a communication unit comprising communication circuitry configured to communicate with an external charging device; and
a controller comprising processing circuitry electrically connected to the power receiver, the communication unit, and the power storage, and
wherein the controller is configured to:
detect power of a signal in a non-power reception mode from the power receiver, to change an impedance to set the detected power to be within a predetermined range,
generate a limitation signal, the limitation signal regarding a limitation for the power storage in a low-power transfer mode,
communicate with the external charging device in a charging operation mode responsive to the detected power, after the electronic device communicates with the external charging device responsive to the detected power, send a release signal for removing the limitation on the power storage in a low-power reception mode, and
receive a charging power from the external charging device, and charge the power storage in a power reception mode.

\* \* \* \* \*